(12) United States Patent
Vyas et al.

(10) Patent No.: US 11,810,105 B2
(45) Date of Patent: Nov. 7, 2023

(54) SYSTEM AND METHOD FOR AUTHORIZING AND PROVISIONING A TOKEN TO AN APPLIANCE

(71) Applicant: Visa International Service Association, San Francisco, CA (US)

(72) Inventors: Surendra Vyas, Bangalore (IN); Vaibhav Shukla, Bangalore (IN); Sindhu Shankar Rao, Bangalore (IN); Satya Prakash Tripathi, Bangalore (IN); Som Madhab Bhattacharya, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 182 days.

(21) Appl. No.: 16/907,827

(22) Filed: Jun. 22, 2020

(65) Prior Publication Data
US 2020/0402044 A1 Dec. 24, 2020

Related U.S. Application Data

(60) Provisional application No. 62/864,109, filed on Jun. 20, 2019.

(51) Int. Cl.
*G06Q 20/36* (2012.01)
*G06Q 20/40* (2012.01)
*G06Q 20/14* (2012.01)

(52) U.S. Cl.
CPC ..... *G06Q 20/3678* (2013.01); *G06Q 20/3674* (2013.01); *G06Q 20/405* (2013.01); *G06Q 20/145* (2013.01)

(58) Field of Classification Search
CPC ........... G06Q 20/3678; G06Q 20/3674; G06Q 20/405; G06Q 20/145
See application file for complete search history.

(56) References Cited

U.S. PATENT DOCUMENTS 7,742,995 B2 6/2010 Phillips
9,053,471 B2 6/2015 Mages et al.
(Continued)

FOREIGN PATENT DOCUMENTS

CN 105580038 A 5/2016
JP 2002197297 A 7/2002
(Continued)

OTHER PUBLICATIONS

"RFID skimming", Wikipedia, 2016, retrieved from wikipedia.org/w/index.php?title=RFID_skimming&oldid=751821758.
(Continued)

*Primary Examiner* — Jacob C. Coppola
*Assistant Examiner* — Terry Nathan Murray
(74) *Attorney, Agent, or Firm* — THE WEBB LAW FIRM

(57) ABSTRACT

Provided herein is a computer-implemented method for provisioning a token to an appliance. The method includes registering an original account identifier to an appliance, wherein the original account identifier is not associated with any user when registered, associating a device token to the original account identifier, wherein the device token is stored by the appliance, associating a user account identifier to at least one of the device token and the original account identifier, receiving, from the appliance, a transaction request for a transaction, the transaction request including the device token, identifying the user account identifier based on the device token, determining that the transaction is authorized based at least partially on the user account identifier and the original account identifier registered to the at least one appliance, and in response to determining that the transaction is authorized, processing the transaction. A system and appliance are also disclosed.

20 Claims, 12 Drawing Sheets

(56) References Cited

U.S. PATENT DOCUMENTS

| | | | |
|---|---|---|---|
| 9,401,905 B1* | 7/2016 | Kowalski | H04L 67/34 |
| 9,990,786 B1 | 6/2018 | Ziraknejad | |
| 9,996,835 B2 | 6/2018 | Dill et al. | |
| 10,529,017 B1* | 1/2020 | Gianakopoulos | G06Q 10/067 |
| 2008/0209534 A1 | 8/2008 | Keronen et al. | |
| 2009/0023395 A1* | 1/2009 | Chang | G06F 13/102 |
| | | | 455/74.1 |
| 2009/0164382 A1 | 6/2009 | Sally | |
| 2009/0187492 A1 | 7/2009 | Hammad et al. | |
| 2012/0242526 A1* | 9/2012 | Perez | H04M 1/72415 |
| | | | 341/176 |
| 2013/0024372 A1 | 1/2013 | Spodak et al. | |
| 2014/0006277 A1 | 1/2014 | Rao | |
| 2014/0064735 A1* | 3/2014 | Thompson | H04N 21/4222 |
| | | | 340/12.23 |
| 2014/0245411 A1 | 8/2014 | Meng et al. | |
| 2014/0344153 A1 | 11/2014 | Raj et al. | |
| 2015/0227829 A1 | 8/2015 | Finn et al. | |
| 2015/0254650 A1 | 9/2015 | Bondesen et al. | |
| 2015/0262180 A1 | 9/2015 | Hambleton et al. | |
| 2015/0319158 A1 | 11/2015 | Kumnick | |
| 2015/0334165 A1* | 11/2015 | Arling | H04L 67/10 |
| | | | 709/201 |
| 2015/0339663 A1 | 11/2015 | Lopreiato et al. | |
| 2015/0348166 A1 | 12/2015 | Trivedi et al. | |
| 2015/0350806 A1* | 12/2015 | Britton | H04W 4/60 |
| | | | 455/411 |
| 2016/0050565 A1 | 2/2016 | Benoit et al. | |
| 2016/0078434 A1 | 3/2016 | Huxham et al. | |
| 2016/0148202 A1 | 5/2016 | McCormack et al. | |
| 2016/0171479 A1 | 6/2016 | Prakash et al. | |
| 2016/0180370 A1 | 6/2016 | Bogomilsky | |
| 2016/0217459 A1 | 7/2016 | Lindner et al. | |
| 2016/0253657 A1 | 9/2016 | Sohn et al. | |
| 2016/0275488 A1 | 9/2016 | Liu et al. | |
| 2016/0277380 A1 | 9/2016 | Wagner et al. | |
| 2016/0292686 A1 | 10/2016 | Laxminarayanan et al. | |
| 2016/0314458 A1 | 10/2016 | Douglas et al. | |
| 2016/0321651 A1 | 11/2016 | Douglas | |
| 2016/0373458 A1 | 12/2016 | Moreton et al. | |
| 2017/0017958 A1 | 1/2017 | Scott et al. | |
| 2017/0215073 A1 | 7/2017 | Raleigh | |
| 2017/0262841 A1 | 9/2017 | Good et al. | |
| 2018/0005231 A1 | 1/2018 | Grassadonia et al. | |
| 2018/0053157 A1 | 2/2018 | Roffey | |
| 2018/0167762 A1* | 6/2018 | Hatambeiki | H04L 67/34 |
| 2018/0218454 A1* | 8/2018 | Simon | G06Q 40/08 |
| 2018/0232613 A1 | 8/2018 | Chang et al. | |
| 2018/0375665 A1* | 12/2018 | Contenti | H04L 63/0442 |
| 2019/0087814 A1 | 3/2019 | Lassouaoui et al. | |
| 2020/0065473 A1* | 2/2020 | Berdy | H04L 67/12 |
| 2020/0374292 A1* | 11/2020 | Rakshit | H04L 63/1433 |

FOREIGN PATENT DOCUMENTS

| | | |
|---|---|---|
| JP | 2010538359 A | 12/2010 |
| JP | 2014032517 A | 2/2014 |
| JP | 6073942 B2 | 2/2017 |
| JP | 2017068651 A | 4/2017 |
| JP | 2017537421 A | 12/2017 |
| JP | 2018503202 A | 2/2018 |
| KR | 20010110084 A | 12/2001 |
| KR | 20020025988 A | 4/2002 |
| KR | 101484367 B1 | 1/2015 |
| KR | 20160008614 A | 1/2016 |
| KR | 1020160046179 A | 4/2016 |
| KR | 20160146784 A | 12/2016 |
| WO | 2013045743 A2 | 4/2013 |
| WO | 2017209767 A1 | 12/2017 |

OTHER PUBLICATIONS

Taichiro et al., "Sharp HMS Cloud Platforms", Sharp Technical Journal [online], 2016, pp. 9-12 (English-language Abstract).

* cited by examiner

SYSTEM AND METHOD FOR AUTHORIZING AND PROVISIONING A TOKEN TO AN APPLIANCE

CROSS-REFERENCE TO RELATED APPLICATIONS

The present application claims the benefit of U.S. Provisional Patent Application No. 62/864,109, filed Jun. 20, 2019, the content of which is incorporated herein by reference in its entirety.

BACKGROUND

1. Technical Field

Disclosed embodiments relate generally to a system and method for providing an appliance with an original personal account number, and, in one particular embodiment, to a system and method for authorizing and provisioning a token to an appliance for conducting transactions.

2. Technical Considerations

Technological developments in the Internet of Things have enabled smart appliances to transact with merchants over a network. However, currently such smart appliances must make use of the owner's financial instrument, such as a credit card, for transacting with merchants. In other words, the owner makes the payment through digital credentials provisioned on the appliances, which are mapped to financial instruments issued to the owner.

Currently, smart appliances enabled to transact with merchants have a token, corresponding to a primary account number (PAN) issued to the device owner, provisioned on the device, which the device forwards to acquirers and, in turn, to a transaction service provider. At the transaction service provider, the token and a PAN are mapped in a token vault to authorize or decline the transaction.

However, the current model poses a number of major disadvantages. First, a user needs to provision a token associated with the user's own PAN to the appliance, thereby exposing the owner's financial information, potentially across multiple appliances and to numerous merchants or acquirers. Second, with the rise in the sharing economy model, a single person no longer uses one appliance continuously, or exclusively, for long periods, and the current model of providing an owner's PAN on the appliance is not suitable. Moreover, the current model is not feasible for appliances that do not have a single "owner," e.g., rental cars. Further, improvements in technology and business models have given rise to appliances that are intelligent and have decision-making ability. However, an appliance owner may not wish to allow the appliance to make purchases autonomously, which has the potential to disseminate the owner's financial information widely.

Accordingly, there is a need in the art for a method and system for enabling commerce from appliances without relying on financial instruments issued to the appliance owner. Such a solution is possible when appliances are issued on their own financial instruments, e.g., credit/debit cards, which can be tokenized and associated with an owner's financial information, and then used to conduct transactions.

SUMMARY

According to a non-limiting embodiment or aspect, provided is a computer-implemented method for authorizing and provisioning a token to an appliance, including the steps of registering, with at least one processor, an original account identifier to at least one appliance, wherein the original account identifier is not associated with any user; associating, with at least one processor, a device token to the original account identifier, wherein the device token is stored by the at least one appliance; associating, with at least one processor, a user account identifier for a user to at least one of the device token and the original account identifier registered to the at least one appliance; receiving, from the at least one appliance, a transaction request for a transaction, the transaction request comprising the device token; identifying, with at least one processor, the user account identifier based on the device token; determining, with at least one processor, that the transaction is authorized based at least partially on the user account identifier and the original account identifier registered to the at least one appliance; and in response to determining that the transaction is authorized, processing the transaction.

According to another non-limiting embodiment or aspect, provided herein is a system for authorizing and provisioning a token to an appliance, including at least one processor programmed and/or configured to register an original account identifier to at least one appliance, wherein the original account identifier is not associated with any user; associate a device token to the original account identifier, wherein the device token is stored by the at least one appliance; associate a user account identifier for a user to at least one of the device token and the original account identifier registered to the at least one appliance; receive, from the at least one appliance, a transaction request for a transaction, the transaction request comprising the device token; identify the user account identifier based on the device token; determine that the transaction is authorized based at least partially on the user account identifier and the original account identifier registered to the at least one appliance; and in response to determining that the transaction is authorized, process the transaction.

According to another non-limiting embodiment or aspect, provided herein is a computer-implemented method for authorizing an appliance to process a transaction, including the steps of registering, with at least one processor, an original account identifier to at least one appliance, wherein the original account identifier is not associated with any user; receiving, from the at least one appliance, a transaction request comprising at least one of the original account identifier and a token uniquely identifying the original account identifier; generating, with at least one processor, an authorization request comprising the original account identifier; and communicating the authorization request to an issuer system associated with the original account identifier.

According to another non-limiting embodiment or aspect, provided herein is an appliance for conducting transactions without a user-specific account, including a memory internal to the appliance, the memory comprising a device account identifier not associated with any user and a device token uniquely associated with the device account identifier; a communication device; and a processor in communication with the memory and the communication device, the processor programmed or configured to generate a transaction request comprising at least one of the device account identifier and the device token.

According to another non-limiting embodiment or aspect, provided herein is a computer-implemented method for authorizing and provisioning a token to an appliance, including the steps of registering, with at least one processor, an original account identifier to at least one appliance, wherein the original account identifier is not associated with any user; generating, with at least one processor, an appliance credit score for the at least one appliance based at least partially on at least one of the following device parameters: model, manufacturer, transaction history, age, service history, appliance serial number, time used, energy used, energy efficiency, appliance location, whether use of the appliance is commercial use or personal use or any combination thereof; and associating, with at least one processor, a device token and a device profile to the original account identifier, wherein the device token is stored the at least one appliance, a communication device associated with the at least one appliance, or machine-readable indicia associated with the at least one appliance.

According to another non-limiting embodiment or aspect, provided is a computer-implemented method for authorizing and provisioning a token to an appliance, including: registering, with at least one processor, an original account identifier to at least one appliance, wherein the original account identifier is not associated with any user when registered; associating, with at least one processor, a device token to the original account identifier, wherein the device token is stored by the at least one appliance, associating; with at least one processor, a user account identifier to at least one of the device token and the original account identifier registered to the at least one appliance; storing, with at least one processor, the association of the original account identifier and the device token in a token vault, storing; with at least one processor, an association of a user account token associated with the user account identifier and the device token in a cloud-based token vault that is separate from the token vault; receiving, from the at least one appliance, a transaction request for a transaction, the transaction request comprising the device token; identifying, with at least one processor, the user account identifier based on the device token received in the transaction request; determining, with at least one processor, that the transaction is authorized based at least partially on the association of the user account token and the device token stored in the cloud-based token vault; and in response to determining that the transaction is authorized, processing the transaction.

According to another non-limiting embodiment or aspect, provided herein is a system for authorizing and provisioning a token to an appliance, including at least one processor programmed and/or configured to: register an original account identifier to at least one appliance, wherein the original account identifier is not associated with any user when registered; associate a device token to the original account identifier, wherein the device token is stored by the at least one appliance; associate a user account identifier for a user to at least one of the device token and the original account identifier registered to the at least one appliance; store the association of the original account identifier and the device token in a token vault; store an association of a user account token associated with the user account identifier and the device token in a cloud-based token vault that is separate from the token vault; receive, from the at least one appliance, a transaction request for a transaction, the transaction request comprising the device token; identify the user account identifier based on the device token received in the transaction request; determine that the transaction is authorized based at least partially on the association of the user account token associated with the user account identifier and the device token stored in the cloud-based token vault; and in response to determining that the transaction is authorized, process the transaction.

Further embodiments or aspects are set forth in the following numbered clauses:

Clause 1: A computer-implemented method for authorizing and provisioning a token to an appliance, comprising: registering, with at least one processor, an original account identifier to at least one appliance, wherein the original account identifier is not associated with any user; associating, with at least one processor, a device token to the original account identifier, wherein the device token is stored by the at least one appliance; associating, with at least one processor, a user account identifier for a user to at least one of the device token and the original account identifier registered to the at least one appliance; receiving, from the at least one appliance, a transaction request for a transaction, the transaction request comprising the device token; identifying, with at least one processor, the user account identifier based on the device token; determining, with at least one processor, that the transaction is authorized based at least partially on the user account identifier and the original account identifier registered to the at least one appliance; and in response to determining that the transaction is authorized, processing the transaction.

Clause 2: The computer-implemented method of clause 1, wherein determining that the transaction is authorized comprises: communicating an authorization request to an issuer system associated with the original account identifier registered to the at least one appliance; communicating an authorization request to an issuer system associated with the user account identifier; and receiving at least one authorization response message from at least one of the issuer system associated with the user account identifier and the issuer system associated with the original account identifier registered to the at least one appliance.

Clause 3: The computer-implemented method of clause 1 or clause 2, wherein registering the original account identifier to the at least one appliance comprises associating at least one device identifier unique to the at least one appliance with the original account identifier.

Clause 4: The computer-implemented method of any of clauses 1-3, further comprising: aggregating transaction values from the transaction and at least one other transaction initiated by the at least one appliance within a time period to calculate an aggregated transaction value; and generating an authorization request to deduct the aggregated transaction value from a user account corresponding to the user account identifier.

Clause 5: The computer-implemented method of any of clauses 1-4, further comprising generating at least one device profile for the at least one appliance based at least partially on at least one of the following device parameters: model, manufacturer, transaction history, age, service history, or any combination thereof.

Clause 6: The computer-implemented method of any of clauses 1-5, further comprising generating a credit limit value for the at least one appliance based at least partially on the device profile.

Clause 7: The computer-implemented method of any of clauses 1-6, wherein processing the transaction comprises: determining that a transaction value associated with the transaction satisfies the credit limit value; in response to determining that the transaction value does not satisfy the credit limit value, communicating a rejection of the transaction to the at least one appliance or to an acquirer system; receiving, from the at least one appliance and/or at least one other appliance, a new transaction request for the transaction, the new transaction request comprising the device token and at least one other device token associated with the at least one other appliance; and in response to determining that the new transaction is authorized, processing the new transaction by charging a first portion of the transaction value to an account corresponding to the device token and a second portion of the transaction value to an account corresponding to the at least one other device token.

Clause 8: The computer-implemented method of any of clauses 1-7, wherein registering the original account identifier to the at least one appliance comprises generating the credit limit value.

Clause 9: The computer-implemented method of any of clauses 1-8, further comprising altering, with at least one processor and based at least partially on the device profile, the credit limit value.

Clause 10: The computer-implemented method of any of clauses 1-9, further comprising associating a merchant domain restriction with the device token based at least partially on the at least one device profile.

Clause 11: The computer-implemented method of any of clauses 1-10, wherein processing the transaction comprises: determining, based on the device token and the merchant domain restriction, that a transaction is authorized; and in response to determining that the transaction is authorized, processing the transaction.

Clause 12: The computer-implemented method of any of clauses 1-11, further comprising associating, with at least one processor, a second user account identifier for a user to the at least one of the device token and the original account identifier registered to the at least one appliance.

Clause 13: The computer-implemented method of any of clauses 1-12, wherein determining that the transaction is authorized comprises: communicating an authorization request to an issuer system associated with the original account identifier registered to the at least one appliance; communicating an authorization request to an issuer system associated with the user account identifier; communicating an authorization request to an issuer system associated with the second user account identifier; and receiving at least one authorization response message from at least one of the issuer system associated with the user account identifier and the issuer system associated with the original account identifier and/or the second user account identifier registered to the at least one appliance.

Clause 14: The computer-implemented method of any of clauses 1-13, further comprising applying, with at least one processor, one or more pre-determined rules to the authorization request and apportioning a transaction amount between the user account identifier and the second user account identifier based on the one or more pre-determined rules.

Clause 15: The computer-implemented method of any of clauses 1-14, further comprising: registering, with at least one processor, a second original account identifier to at least one appliance, wherein the second original account identifier is not associated with any user; associating, with at least one processor, a second device token to the second original account identifier, wherein the device token is stored by the at least one appliance; and associating, with at least one processor, a user account identifier for a user to at least one of the second device token and the second original account identifier registered to the at least one appliance.

Clause 16: The computer-implemented method of any of clauses 1-15, wherein determining that the transaction is authorized comprises: applying, with at least one processor, one or more pre-determined rules to a transaction authorization request associated with the appliance; based on application of the one or more pre-determined rules, selecting, with at least one processor, the original account identifier or the second original account identifier for the transaction; communicating an authorization request to an issuer system associated with the original account identifier or the second original account identifier registered to the at least one appliance; communicating an authorization request to an issuer system associated with the user account identifier associated with the original account identifier or the second original account identifier; and receiving at least one authorization response message from at least one of the issuer system associated with the user account identifier and the issuer system associated with the original account identifier or the second original account identifier registered to the at least one appliance.

Clause 17: The computer-implemented method of any of clauses 1-16, wherein the association of the user account identifier and the original account identifier and/or the device token is stored in a token vault.

Clause 18: The computer-implemented method of any of clauses 1-17, wherein the token vault stores an association of the user account identifier and the original account identifier and wherein an association of a token associated with the user account identifier and the device token is stored in a cloud-based token vault that is separate from the token vault.

Clause 19: A system for authorizing and provisioning a token to an appliance, comprising at least one processor programmed and/or configured to: register an original account identifier to at least one appliance, wherein the original account identifier is not associated with any user; associate a device token to the original account identifier, wherein the device token is stored by the at least one appliance; associate a user account identifier for a user to at least one of the device token and the original account identifier registered to the at least one appliance; receive, from the at least one appliance, a transaction request for a transaction, the transaction request comprising the device token; identify the user account identifier based on the device token; determine that the transaction is authorized based at least partially on the user account identifier and the original account identifier registered to the at least one appliance; and in response to determining that the transaction is authorized, process the transaction.

Clause 20: The system of clause 19, wherein the at least one processor is programmed and/or configured to determine that the transaction is authorized by: communicating an authorization request to an issuer system associated with the original account identifier registered to the at least one appliance; communicating an authorization request to an issuer system associated with the user account identifier; and receiving at least one authorization response message from at least one of the issuer system associated with the user account identifier and the issuer system associated with the original account identifier registered to the at least one appliance.

Clause 21: The system of clause 19 or clause 20, wherein the at least one processor is programmed and/or configured to register the original account identifier to the at least one appliance by associating at least one device identifier unique to the at least one appliance with the original account identifier.

Clause 22: The system of any of clauses 19-21, wherein the at least one processor is further programmed and/or configured to: aggregate transaction values from the transaction and at least one other transaction initiated by the at least one appliance within a time period to calculate an aggregated transaction value; and generate an authorization request to deduct the aggregated transaction value from a user account corresponding to the user account identifier.

Clause 23: The system of any of clauses 19-22, wherein the at least one processor is further programmed and/or configured to generate a device profile for the at least one appliance based at least partially on at least one of the following device parameters: model, manufacturer, transaction history, age, service history, or any combination thereof.

Clause 24: The system of any of clauses 19-23, wherein the at least one processor is further programmed and/or configured to generate a credit limit value for the at least one appliance based at least partially on the device profile.

Clause 25: The system of any of clauses 19-24, wherein the at least one processor is programmed and/or configured to process the transaction by: determining that a transaction value associated with the transaction satisfies the credit limit value; in response to determining that the transaction value does not satisfy the credit limit value, communicating a rejection of the transaction to the at least one appliance; receiving, from the at least one appliance and/or at least one other appliance, a new transaction request for the transaction, the new transaction request comprising the device token and at least one other device token associated with the at least one other appliance; and in response to determining that the new transaction is authorized, processing the new transaction by charging a first portion of the transaction value to an account corresponding to the device token and a second portion of the transaction value to an account corresponding to the at least one other device token.

Clause 26: The system of any of clauses 19-25, wherein registering the original account identifier to the at least one appliance comprises generating the credit limit value.

Clause 27: The system of any of clauses 19-26, wherein the at least one processor is further programmed and/or configured to alter, based at least partially on the device profile, the credit limit value.

Clause 28: The system of any of clauses 19-27, wherein the at least one processor is programmed and/or configured to alter the credit limit value when the user account identifier is associated with the device token or the original account identifier is registered to the at least one appliance.

Clause 29: The system of any of clauses 19-28, wherein the at least one processor is programmed or configured to associate a merchant domain restriction with the device token based at least partially on the device profile.

Clause 30: The system of any of clauses 19-29, wherein the at least one processor is programmed and/or configured to process the transaction by: determining, based on the device token and the associated merchant domain restriction, whether a transaction is authorized; and in response to determining that the transaction is not authorized, communicating a rejection of the transaction to the at least one appliance; or in response to determining that the transaction is authorized, processing the transaction.

Clause 31: The system of any of clauses 19-30, wherein the at least one processor is further programmed and/or configured to associate, with at least one processor, a second user account identifier for a user to the at least one of the device token and the original account identifier registered to the at least one appliance.

Clause 32: The system of any of clauses 19-31, wherein the at least one processor is further programmed and/or configured to: communicate an authorization request to an issuer system associated with the original account identifier registered to the at least one appliance; communicate an authorization request to an issuer system associated with the user account identifier; communicate an authorization request to an issuer system associated with the second user account identifier; and receive at least one authorization response message from at least one of the issuer system associated with the user account identifier and the issuer system associated with the original account identifier and/or the second user account identifier registered to the at least one appliance.

Clause 33: The system of any of clauses 19-32, wherein the at least one processor is further programmed and/or configured to apply one or more pre-determined rules to the authorization request and apportion a transaction amount between the user account identifier and the second user account identifier based on the one or more pre-determined rules.

Clause 34: The system of any of clauses 19-33, wherein the at least one processor is further programmed and/or configured to: register a second original account identifier to at least one appliance, wherein the second original account identifier is not associated with any user; associate a second device token to the second original account identifier, wherein the device token is stored by the at least one appliance; and associate a user account identifier for a user to at least one of the second device token and the second original account identifier registered to the at least one appliance.

Clause 35: The system of any of clauses 19-34, wherein the at least one processor is further programmed and/or configured to: apply one or more pre-determined rules to a transaction authorization request associated with the appliance; based on application of the one or more pre-determined rules, select the original account or the second original account for the transaction; communicate an authorization request to an issuer system associated with the original account identifier or the second original account identifier registered to the at least one appliance; communicate an authorization request to an issuer system associated with the user account identifier associated with the original account identifier or the second original account identifier; and receive at least one authorization response message from at least one of the issuer system associated with the user account identifier and the issuer system associated with the original account identifier or the second original account identifier registered to the at least one appliance.

Clause 36: The system of any of clauses 19-35, wherein the at least one processor is further configured and/or programmed to store an association of the user account identifier and the original account identifier and/or the device token is stored in a token vault.

Clause 37: The system of any of clauses 19-36, wherein the token vault stores an association of the user account identifier and the original account identifier and wherein an association of a token associated with the user account identifier and the device token is stored in a cloud-based token vault that is separate from the token vault.

Clause 38: A computer-implemented method for authorizing an appliance to process a transaction, comprising: registering, with at least one processor, an original account identifier to at least one appliance, wherein the original account identifier is not associated with any user; receiving, from the at least one appliance, a transaction request comprising at least one of the original account identifier and a token uniquely identifying the original account identifier; generating, with at least one processor, an authorization request comprising the original account identifier; and communicating the authorization request to an issuer system associated with the original account identifier.

Clause 39: The computer-implemented method of clause 38, further comprising generating at least one device profile for the at least one appliance based at least partially on at least one of the following device parameters: model, manufacturer, transaction history, age, service history, or any combination thereof.

Clause 40: The computer-implemented method of clause 38 or clause 39, further comprising generating a credit limit value for the at least one appliance based at least partially on the device profile.

Clause 41: The computer-implemented method of any of clauses 38-40, further comprising: determining that a transaction value associated with the transaction request satisfies the credit limit value; in response to determining that the transaction value does not satisfy the credit limit value, communicate a rejection of the transaction to the at least one appliance; receiving, from the at least one appliance and/or at least one other appliance, a new transaction request for the transaction, the new transaction request comprising a device token and at least one other device token associated with the at least one other appliance; and in response to determining that the new transaction is authorized, processing the new transaction by charging a first portion of the transaction value to an account corresponding to the device token and a second portion of the transaction value to an account corresponding to the at least one other device token.

Clause 42: The computer-implemented method of any of clauses 38-41, wherein the credit limit value is generated during the step of registering the original account identifier to the least one appliance.

Clause 43: The computer-implemented method of any of clauses 38-42, further comprising altering, with at least one processor and based at least partially on the at least one device profile, the credit limit value.

Clause 44: The computer-implemented method of any of clauses 38-43, further comprising associating a merchant domain restriction with the device token based at least partially on the device profile.

Clause 45: The computer-implemented method of any of clauses 38-44, further comprising: determining, based on the device token and the associated merchant domain restriction, whether a transaction is authorized; in response to determining that the transaction is not authorized, communicating a rejection of the transaction to the at least one appliance; or in response to determining that the transaction is authorized, generating, with at least one processor, an authorization request comprising the original account identifier; and communicating the authorization request to an issuer system associated with the original account identifier.

Clause 46: An appliance for conducting transactions without a user-specific account, comprising: a memory internal to the appliance, the memory comprising a device account identifier not associated with any user and a device token uniquely associated with the device account identifier; a communication device; and a processor in communication with the memory and the communication device, the processor programmed or configured to generate a transaction request comprising at least one of the device account identifier and the device token.

Clause 47: The appliance of clause 46, wherein the processor is further programmed or configured to: communicate the transaction request to a transaction processing system; receive a rejection of the transaction request from the transaction processing system; in response to receiving the rejection of the transaction request, generate a new transaction request for the transaction, the new transaction request comprising: at least one of the device account identifier and the device token; and at least one other device account identifier and/or device token associated with at least one other appliance; and communicate the new transaction request to the transaction processing system.

Clause 48: A computer-implemented method for authorizing and provisioning a token to an appliance, comprising: registering, with at least one processor, an original account identifier to at least one appliance, wherein the original account identifier is not associated with any user; generating, with at least one processor, an appliance credit score for the at least one appliance based at least partially on at least one of the following device parameters: model, manufacturer, transaction history, age, service history, appliance serial number, time used, energy used, energy efficiency, appliance location, whether use of the appliance is commercial use or personal use or any combination thereof; and associating, with at least one processor, a device token and a device profile to the original account identifier, wherein the device token is stored in the at least one appliance, a communication device associated with the at least one appliance, or machine-readable indicia associated with the at least one appliance.

Clause 49: The computer-implemented method of clause 48, wherein the step of generating the appliance credit score comprises receiving, with at least one processor and from a processor associated with the appliance, at least one of the device parameters.

Clause 50: The computer-implemented method of clause 48 or clause 49, wherein the step of generating the credit score comprises: generating, with at least one processor and from at least one of the device parameters, at least one weighted value; comparing, with at least one processor, the at least one weighted value to at least one weighted value obtained from at least one other appliance; and generating, with at least one processor and based at least partially on the comparison, the appliance credit score.

Clause 51: The computer-implemented method of any of clauses 48-50, wherein the appliance is an automobile.

Clause 52: The computer-implemented method of any of clauses 48-51, wherein the appliance credit score is based at least partially on at least one of the following device parameters: vehicle identification number (VIN), year of manufacture, make, model, miles driven, number of trips, number of days in operation, fuel consumption, engine size, fuel efficiency, geographic location of use, geographic rating, earning capacity, hybrid compatibility of the automobile, whether the automobile can be upgraded, automobile rating, whether one or more airbags have been deployed, collision probability, or any combination thereof.

Clause 53: The computer-implemented method of any of clauses 48-52, wherein the step of generating the appliance credit score comprises receiving, with at least one processor and from an on-board diagnostic processor associated with the automobile, at least one of the device parameters.

Clause 54: The computer-implemented method of any of clauses 48-53, wherein the step of generating the appliance credit score comprises: generating, with at least one processor and from at least one of the device parameters, at least one weighted value; comparing, with at least one processor, the at least one weighted value to at least one weighted value obtained from at least one other automobile; and generating, with at least one processor and based at least partially on the comparison, the credit score.

Clause 55: The computer-implemented method of any of clauses 48-54, wherein the association of the device token and the device profile to the original account identifier is stored in a token vault.

Clause 56: The computer-implemented method of any of clauses 48-55, wherein the token vault stores an association of the user account identifier and the original account identifier and wherein an association of a token associated with the user account identifier and the device token is stored in is stored in a cloud-based token vault that is separate from the token vault.

These and other features and characteristics of the present systems, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the systems and methods disclosed herein. As used in the specification and the claims, the singular form of "a," "an," and "the" includes plural referents unless the context clearly dictates otherwise.

BRIEF DESCRIPTION OF THE DRAWINGS

Additional advantages and details of the systems and methods are explained in greater detail below with reference to the exemplary embodiments and aspects that are illustrated in the accompanying schematic figures, in which.

DETAILED DESCRIPTION

Figure 1:
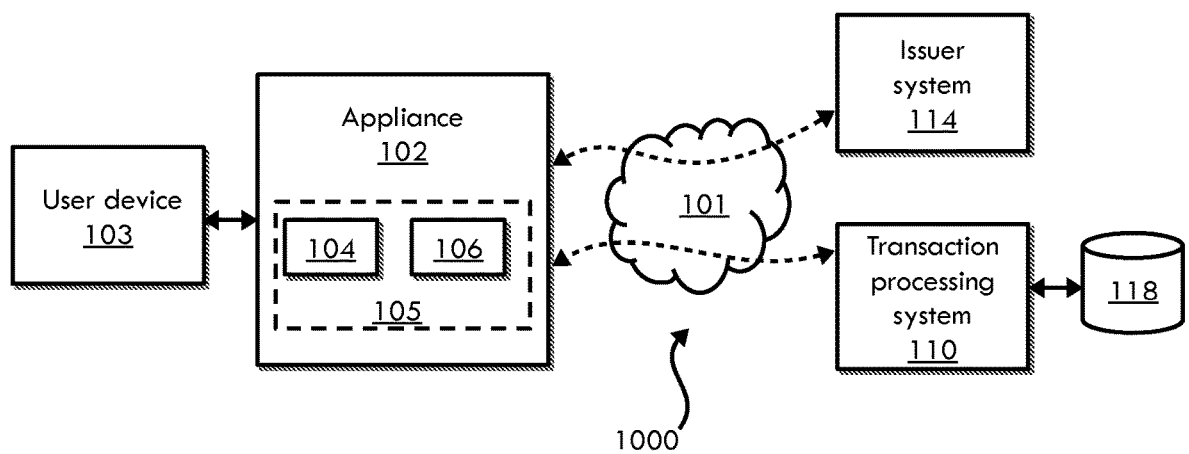
FIG. 1 is a schematic diagram of one embodiment or aspect of a method and system for authorizing and provisioning a token to an appliance.

For purposes of the description hereinafter, the terms "upper," "lower," "right," "left," "vertical," "horizontal," "top," "bottom," "lateral," "longitudinal," and derivatives thereof shall relate to the embodiment or aspect as it is oriented in the drawing figures. However, it is to be understood that the systems and methods may assume various alternative variations and step sequences, except where expressly specified to the contrary. It is also to be understood that the specific devices and the method illustrated in the attached drawings, and described in the following specification, are simply exemplary embodiments of the systems and methods. Hence, specific dimensions and other physical characteristics related to the embodiments disclosed herein are not to be considered as limiting. Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the term "computing device" or may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "appliance" refers to any device with which an owner, user, renter, or lessee may wish to conduct transactions. In non-limiting embodiments or aspects, the term "appliance" refers to any device having a processor, memory, and communication device configured to communicate with one or more other devices or networks. For example, and without limitation, an appliance may include a network-connected vehicle, refrigerator, television, washer/dryer machine, coffee maker, thermostat, and/or the like. In non-limiting embodiments or aspects, the term "appliance" refers to any device that can be retrofitted with one or more of a processor, memory, and/or a communication device configured to communicate with one or more other devices or networks. For example, and without limitation, an appliance may be retrofitted with a Bluetooth-enabled device that can send, receive, and/or store data. In non-limiting embodiments or aspects, the term "appliance" refers to an automobile.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "issuer institution" may refer to one or more entities, such as a bank, that provides accounts to customers for conducting payment transactions, such as initiating credit and/or debit payments. For example, an issuer institution may provide an account identifier, such as a primary account number (PAN), to a customer or appliance that uniquely identifies one or more accounts associated with that customer or appliance. The account identifier may be embodied on a physical financial instrument, such as a payment card, and/or may be electronic and used for electronic payments. As used herein, the term "account identifier" may include one or more PANs, tokens, or other identifiers associated with a customer account. An account identifier may be directly or indirectly associated with an issuer institution, such that an account identifier may be a token that maps to a PAN or other type of account identifier. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifiers in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "merchant" refers to any individual or entity that provides goods and/or services, or access to goods and/or services, to customers based on a transaction, such as a payment transaction. Merchants may include, but are not limited to, restaurants, food trucks, clubs, gymnasiums, retail stores, professional services providers (e.g., dentists, doctors, plumbers, etc.), parks, museums, attractions, sporting venues, and/or the like. It will be appreciated that numerous other types of merchants are within the scope of the disclosed embodiments.

As used herein, the term "acquirer institution" may refer to an entity licensed by the transaction service provider and approved by the transaction service provider to originate transactions using an electronic payment device of the transaction service provider. The transactions may include original credit transactions (OCTs) and account funding transactions (AFTs). The acquirer institution may be authorized by the transaction service provider to originate transactions using an electronic payment device of the transaction service provider. The acquirer institution may contract with a payment gateway to enable the facilitators to sponsor merchants. An acquirer institution may be a financial institution, such as a bank. The terms "acquirer institution," "acquirer bank," and "acquirer system" may also refer to one or more computer systems operated by or on behalf of an acquirer institution, such as a server computer executing one or more software applications.

As used herein, the term "financial device" may refer to a portable (e.g., physical) payment card, a gift card, a smartcard, a smart media, a payroll card, a healthcare card, a wrist band, a machine-readable medium containing account information, a keychain device, a supermarket discount card, a cellular phone, a mobile device, a personal digital assistant (PDA), a pager, a security card, a computer, an access card, a wireless terminal, or a transponder. The financial device may include volatile or non-volatile memory to store information, such as the account number or a name of the account holder. The term "financial device" may also refer to any unique identifier, physical or digital, associated with a financial transaction account that can be used to complete a transaction between a user of the financial device and another party, such as a merchant. For example, a financial device may be a financial transaction account number and confirmation code that may be entered into an online store payment interface. It will be appreciated that many other configurations and embodiments are possible.

As used herein, the term "merchant system" may refer to one or more server computers, point-of-sale devices, online interfaces, third-party hosted services, and/or the like that are used to complete transactions with one or more financial devices. The term merchant system may also refer to one or more server computers, processors, online interfaces, third-party hosted services, and/or the like that are used to transmit and/or receive communications with issuer institutions, transaction service providers, transaction processing servers, financial device holders, and/or the like.

As used herein, the term "transaction service provider" may refer to an entity that collects authorization requests from merchants and provides guarantees of payment, in some cases through an agreement between the transaction service provider and an issuer institution. As used herein, the term "recurring transactions" may refer to any series of repeated or patterned transactions between a financial device and a merchant. Recurring transactions are often regular and of a similar amount but do not need to be identical in cost or identical in purchased goods/services to be recurring.

As used herein, the term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "mobile device" may refer to one or more portable electronic devices that are configured to communicate with one or more networks. As an example, a mobile device may include a cellular phone (e.g., a smartphone or standard cellular phone), a portable computer, a wearable device (e.g., watches, glasses, lenses, clothing, and/or the like), a PDA, and/or other like devices.

As used herein, "associating" two or more data elements, such as identifiers and/or tokens, means to link and/or correspond such data elements in one or more data structures such that a relationship is formed between the data elements. For example, a user identifier that is "associated with" a token or a second user identifier may refer to a user identifier stored in a data structure with the token or second user identifier and/or stored in a data structure with a pointer that points to the token or second user identifier.

Non-limiting embodiments provide for an improved system and method for conducting transactions with appliances by issuing an original account identifier to an appliance, provisioning a token to the appliance, and authorizing the appliance for processing a transaction request. By issuing an original account identifier to an appliance and provisioning a token corresponding to the account identifier to the appliance, non-limiting embodiments allow for such appliances to be provided to users, such as purchasers or lessees, without risking exposure of the users' personal financial information that may be otherwise inputted into or associated with the appliance. Moreover, non-limiting embodiments provide for an improved appliance with memory including a device token and/or a device PAN that can be used to initiate and conduct transactions with various merchant systems. Such improved appliances provide for a more secure and efficient transaction flow, as well as other advantages described herein.

Provided herein are a system and method for provisioning a token to an appliance. FIG. 1 illustrates a system (1000) to provision a token to an appliance according to one non-limiting embodiment or aspect. In FIG. 1, the system (1000) includes an appliance (102), an issuer system (114), and a transaction processing system (110). The components may communicate through a network (101). During the manufacture of the appliance, or thereafter, an original device personal account number ($D_{PAN}$) (104) is registered to the appliance (102) by issuer system (114) and/or transaction processing system (110). The $D_{PAN}$ (104) is an original PAN that is not associated with a user or appliance owner at the time of issuance, such that the $D_{PAN}$ (104) is not issued to a human being, even though in some non-limiting embodiments the $D_{PAN}$ (104) may be subsequently linked to a user PAN. In some non-limiting embodiments or aspects, both the issuer system (114) and the transaction processing system (110) collaborate to issue the $D_{PAN}$ (104) to the appliance. In some non-limiting embodiments or aspects, registering the original account identifier includes associating a unique device identifier specific to the appliance with the $D_{PAN}$ (104). The unique device identifier specific to the appliance may be encoded into memory (105) of the appliance (102).

With further reference to FIG. 1, in non-limiting embodiments or aspects, the appliance (102) may be provisioned with the $D_{PAN}$ (104) for making transactions. However, in other non-limiting embodiments, the appliance may be provisioned with a device token ($D_{Token}$) (106) instead of or in addition to the $D_{PAN}$ (104). For example, a $D_{Token}$ (106) may be provisioned on the appliance (102) so as to not expose the $D_{PAN}$ (104) to any potential security vulnerabilities. It will be appreciated that, although FIG. 1 illustrates both the $D_{Token}$ (106) and $D_{PAN}$ (104), non-limiting embodiments may include just the $D_{Token}$ (106) or just the $D_{PAN}$ (104).

Still referring to FIG. 1, in non-limiting embodiments in which the appliance (102) is provisioned with the $D_{Token}$ (106), the transaction processing system (110) tokenizes the $D_{PAN}$ (104) by generating the $D_{Token}$ (106) and associating the $D_{Token}$ (106) with the $D_{PAN}$ (104). The associated $D_{PAN}$ (104) and $D_{Token}$ (106) are stored in a token vault (118) which, in non-limiting embodiments, includes a secure database. At this stage, the $D_{PAN}$ (104) and $D_{Token}$ (106) are not associated with any user or owner financial information, such as a user PAN (e.g., a Master PAN ($M_{PAN}$)). A non-limiting embodiment or aspect of a token vault architecture is illustrated below:

| Device Token ($D_{Token}$) | Device PAN ($D_{PAN}$) | Master PAN ($M_{PAN}$) |
|---|---|---|
| $D_{Token1}$ | $D_{PAN1}$ | NULL |

The transaction processing system (110) communicates $D_{Token}$ (106) to the appliance (102) for storage thereon. At this stage, the $D_{Token}$ (106) resides on the appliance (102) in an inactive state.

Appliance (102) may then be purchased, rented, or leased by a user. With further reference to FIG. 1, also illustrated is a user device (103). A user device (103) may be any type of client device that allows a user to interact with the appliance (102) and/or transaction processing system (110), for example, and without limitation, a smartphone, tablet, a computing device, a remote control, or the like. However, any action described as taking place through or using user device (103) should be understood to also be possible by direct interaction of the user with the appliance (102) itself, for example, through a user interface and input device disposed on appliance (102). The user device (103) may be used to activate $D_{Token}$ (106) stored in appliance (102).

In non-limiting embodiments or aspects, once the $D_{PAN}$ (104) and/or $D_{Token}$ (106) are provisioned on the appliance (102), the appliance (102) may be used to initiate transaction requests using the $D_{PAN}$ (104) and/or $D_{Token}$ (106). However, in some non-limiting embodiments, the $D_{PAN}$ (104) and/or $D_{Token}$ (106) may need to be activated before being used. As an example, the $D_{PAN}$ (104) and/or $D_{Token}$ (106) may be activated by a user associating his or her $M_{PAN}$ with the $D_{PAN}$ (104) and/or $D_{Token}$ (106), such that the user is ultimately responsible for the transactions initiated using the $D_{PAN}$ (104) and/or $D_{Token}$ (106) while activated for that particular user.

In non-limiting embodiments or aspects, $D_{Token}$ (106) is activated upon initial use of appliance (102) or upon a user selection to undergo an activation process. The user may be prompted to, through appliance (102) or user device (103), communicate ownership or possession of appliance (102) to transaction processing system (110). Transaction processing system (110), in response to an activation request initiated by the owner, then associates an account identifier associated with an electronic payment device issued to the user (e.g., a credit or debit card), such as $M_{PAN}$, with the appliance (102). In some non-limiting embodiments or aspects, an activation request to associate the $M_{PAN}$ with $D_{PAN}$ (104) and/or $D_{Token}$ (106) is communicated through appliance (102) to transaction processing system (110). In some non-limiting embodiments or aspects, the user or appliance (102) provides identifying information for the appliance (102) to allow user to, through user device (103), communicate the association request to the transaction processing system (110). Identifying information may be any type of information that identifies the appliance (102), such as a unique device identifier. A unique device identifier may include, for example and without limitation, a serial number, a randomly generated alphanumeric identifier, a unique appliance attribute, and/or the like. In non-limiting embodiments or aspects, the identifying information may be provided as machine-readable indicia, such as a barcode (e.g., a two-dimensional barcode, a three-dimensional barcode, a QR code, or the like), an RFID transponder, or the like that user device (103) can read and transmit to transaction processing system (110).

The user may also provide the $M_{PAN}$ through the user device (103), appliance (102), point-of-sale (POS) system, or through another device. As an example, a user may scan his or her electronic payment device through a mobile application on the user device (103), which analyzes an image of the electronic payment device and determines the $M_{PAN}$ and other information from the image, such as expiration date and security code. In other examples, the user may manually input the $M_{PAN}$ and other information. It will be appreciated that the user may provide the $M_{PAN}$ in any number of ways and, in some non-limiting examples, the transaction processing system (110) and/or issuer system (114) may already have the $M_{PAN}$ and can identify it based on an identification of the user. In other non-limiting embodiments, the user may present his or her electronic payment device at a POS system at the time of purchasing or leasing the appliance (102) such that the $M_{PAN}$ is communicated to the transaction processing system (110) from the POS system. In still further examples, the user may provide the $M_{PAN}$ by logging into an existing bank account or electronic wallet. It will be appreciated that the $M_{PAN}$ may be provided in various other ways.

In response to transaction processing system (110) receiving an activation request initiated by the user, through appliance (102) or user device (103) as examples, the transaction processing system (110) may retrieve, identify, or receive the $M_{PAN}$ as explained above. Transaction processing system (110), in response to the activation request and/or obtaining the $M_{PAN}$, then associates the $M_{PAN}$ with the $D_{PAN}$ (104) and/or $D_{Token}$ (106) in the token vault (118):

| Device Token ($D_{Token}$) | Device PAN ($D_{PAN}$) | Master PAN ($M_{PAN}$) |
|---|---|---|
| $D_{Token1}$ | $D_{PAN1}$ | $M_{PAN1}$ |

In some non-limiting embodiments or aspects, a device profile may be generated for appliance (102). The device profile may be based on, for example and without limitation, one or more appliance parameters such as a unique identifier (e.g., a device identifier), an appliance type, an appliance model, an appliance manufacturer, an appliance transaction history, an appliance age, an appliance use time, an appliance service history, and/or combinations thereof. The device profile may be associated with the $D_{Token}$ (104) and/or $D_{PAN}$ (106) in a database, such as but not limited to the token vault (118). The device profile may be generated by the issuer system (114), the transaction processing system (110), the appliance itself (102), or any other device or system. In some non-limiting examples, the device profile may be a set of appliance parameters, a score or rating generated from a set of appliance parameters, or a predefined profile category.

In some non-limiting embodiments or aspects, domain restrictions may be generated for the appliance (102). In non-limiting embodiments or aspects, the domain restrictions may be based at least partially on the device profile. Non-limiting examples of domain restrictions include credit/debit limit values, transaction limit values, restrictions on the number of transactions, duration (lifespan) of the $D_{Token}$, and/or merchant domain restrictions, such as merchant category restrictions or merchant location restrictions, and merchant loyalty or reward point program restrictions. As an example, in non-limiting embodiments, an appliance provisioned with a $D_{Token}$ and/or $D_{PAN}$ may be restricted to making purchases for items and/or content usable by the appliance (e.g., streaming media for televisions, fuel for automobiles, and/or the like).

In non-limiting embodiments or aspects, the domain restriction may be modified at varying times of the appliance's lifespan. For example, and without limitation, an appliance may be restricted to a certain credit/debit limit value prior to the $D_{Token}$ (106) and/or $D_{PAN}$ (104) being associated with an $M_{PAN}$. In non-limiting embodiments, the credit/debit limit value may be increased with increasing duration of ownership and/or association with an $M_{PAN}$. In other non-limiting embodiments or aspects, an appliance user may manually request modification of the credit/debit limit value for an appliance.

In non-limiting embodiments, the device profile may be used to implement targeted promotional recommendations, offers, and/or merchant loyalty or reward point program restrictions. Because an appliance's $D_{PAN}$ may be restricted for use with certain merchants and/or for the purchase of certain products/services or classes of products/services, a merchant may provide targeted promotions and offers to the appliance. As a result, loyalty rewards or points may accumulate more quickly given the specific field of use of the $D_{PAN}$. In some non-limiting examples, an appliance with a high balance of loyalty rewards or points may maintain a higher resale or residual value for a user/owner, should the user offer the appliance for sale, end a lease, or otherwise provide the appliance to someone else.

With continuing reference to FIG. 1, when a user of appliance (102) (e.g., owner of the appliance, user/lessee of the appliance, etc.) sells, returns, or otherwise relinquishes ownership, possession, and/or control of appliance (102), the user and/or user device (103) may communicate with transaction processing system (110) in a similar manner as described above for associating an $M_{PAN}$ to the $D_{PAN}$ (104) and/or $D_{Token}$ (106) (e.g., through user device (103) or directly through appliance (102)) to disassociate the owner's $M_{PAN}$ from the $D_{PAN}$ (104) and/or $D_{Token}$ (106). Transaction processing system (110) then disassociates the $M_{PAN}$ from the $D_{PAN}$ (104) and $D_{Token}$ (106) in token vault (118) as shown in the following table:

| Device Token ($D_{Token}$) | Device PAN ($D_{PAN}$) | Master PAN ($M_{PAN}$) |
|---|---|---|
| $D_{Token1}$ | $D_{PAN1}$ | NULL |

With no corresponding $M_{PAN}$ associated with the $D_{PAN}$ (104) and/or $D_{Token}$ (106) in token vault (118), no transaction may be validated or authorized. In addition, in some non-limiting embodiments or aspects, a credit/debit limit value can be decreased when a $D_{PAN}$ is disassociated from an $M_{PAN}$, reducing the potential loss due to any errors in validating/authorizing transactions. In some non-limiting embodiments or aspects, the $M_{PAN}$ may be disassociated from the $D_{PAN}$ and/or $D_{Token}$ in response to an activation request from another user or the same user with a different $M_{PAN}$.

Figure 2:
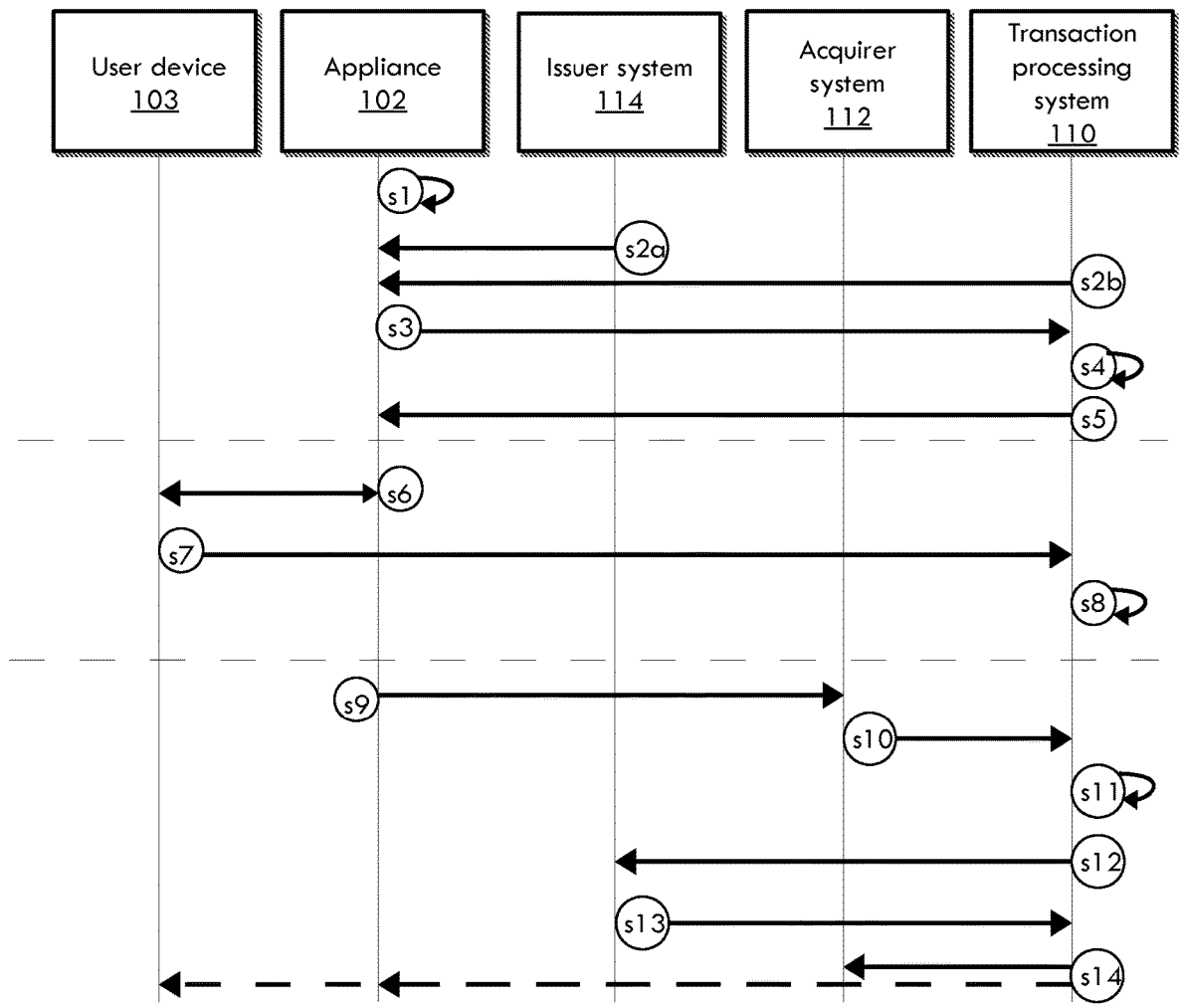
FIG. 2 is a process diagram of one embodiment or aspect of a method for authorizing and provisioning a token to an appliance.

With reference to FIG. 2, illustrated is a method of provisioning a token to an appliance according to a non-limiting embodiment. In step (s1), the appliance manufacturer, distributor, or reseller includes in the appliance (102) memory for storing a $D_{PAN}$ and $D_{Token}$. In some non-limiting embodiments or aspects, the memory includes a secure and/or encrypted memory space. In some non-limiting embodiments or aspects, a $D_{Token}$ that is unassociated with a $D_{PAN}$ may be stored in memory at this time. In step (s2), a $D_{PAN}$ is issued to the appliance. The $D_{PAN}$ is issued by issuer system (114) in step (s2a), by transaction processing system (110) in step (s2b), or both. In embodiments or aspects, for example and without limitation, those in which transaction processing system (110) is not involved in issuing a $D_{PAN}$ and a $D_{Token}$ has not already been stored in the appliance, in step (s3), $D_{PAN}$ is communicated to transaction processing system to be tokenized. Transaction processing system tokenizes $D_{PAN}$ step (s4), thereby generating $D_{Token}$. The $D_{Token}$ is then communicated to the appliance (102) in step (s5), where it is stored, inactive until purchased, rented, leased, or other form of possession by a user.

After $D_{Token}$ is provisioned to the appliance (102), and with further reference to FIG. 2, $D_{Token}$ may be activated by a user. In step (s6) via user device (103) or the appliance (102) provides identifying information that owner communicates in step (s7) to transaction processing system (110) to allow transaction processing system (110) to associate the user's electronic payment device, including the $M_{PAN}$, with the $D_{PAN}$ and/or $D_{Token}$ in step (s8).

Figure 3:
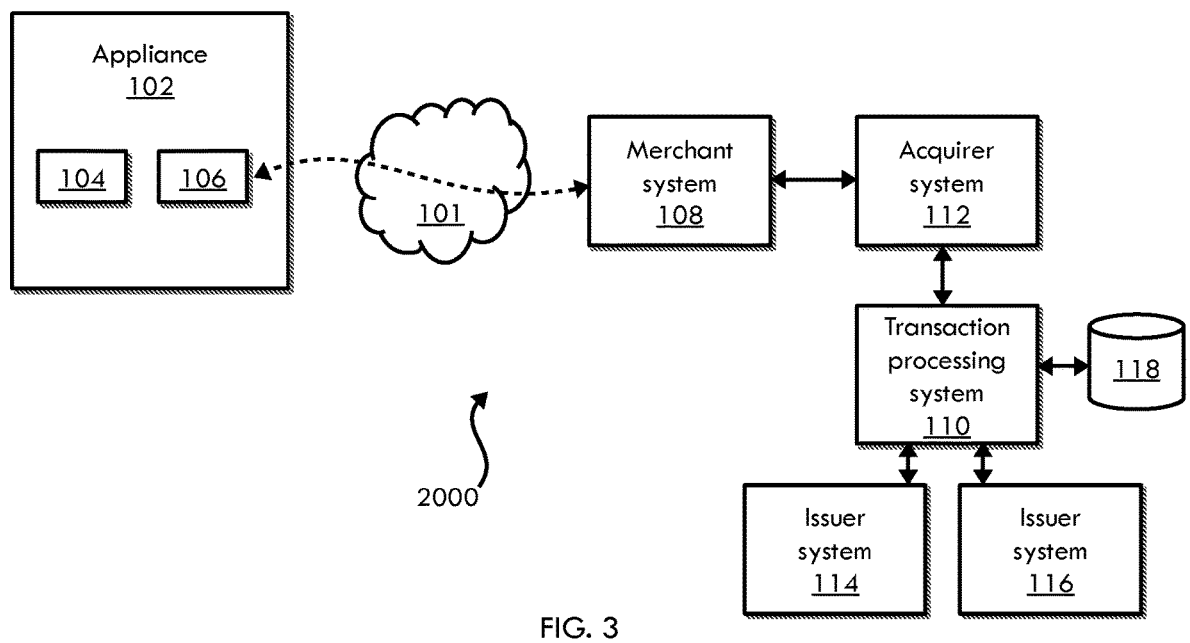
FIG. 3 is a schematic diagram of one embodiment or aspect of a method and system for authorizing and provisioning a token to an appliance to process a transaction.

FIG. 3 illustrates a system (2000) to process a transaction using a $D_{Token}$ according to a non-limiting embodiment or aspect. In FIG. 3, the system (2000) includes an appliance (102), a merchant system (108), an acquirer system (112), an issuer system (114), and a transaction processing system (110). The components may communicate through network (101). When making a transaction, the appliance (102) communicates a transaction request, which may include $D_{Token}$ (106) and/or $D_{PAN}$ (104), and in some non-limiting embodiments, transaction data, to the merchant system (108), which then communicates the transaction request to the acquirer system (112), such as an acquiring bank's system. The transaction data may include, for example and without limitation, transaction value, transaction date, transaction time, transaction location, merchant identifier(s), identification of product(s)/service(s) being purchased, appliance information (e.g., a unique device identifier, a device profile, etc.) and/or the like. The acquirer system (112) then communicates the transaction request to the transaction processing system (110) to validate the transaction request and receive authorization to process the transaction. Such authorization may proceed in a two-step process.

First, in non-limiting embodiments or aspects, the transaction processing system (110) may conduct a check of the $D_{Token}$ (106) and/or $D_{PAN}$ (104) in the token vault (118), and, in response to determining that the $D_{Token}$ (106) and/or $D_{PAN}$ (104) are associated with an $M_{PAN}$ in the token vault (118), the transaction processing system (110) may determine that the transaction is authorized. Determining that the transaction is authorized may also include checking any domain restrictions associated with the $D_{Token}$ (106) and/or $D_{PAN}$ (104), verifying that the $M_{PAN}$ is valid and can be used for the transaction and/or the like. In some non-limiting embodiments, determining that the transaction is authorized includes checking if a unique device identifier included in the transaction request matches a unique identifier associated with the $D_{Token}$ (106) and/or $D_{PAN}$ (104). If the transaction is determined to be authorized, transaction processing system (110) processes the transaction.

In non-limiting embodiments or aspects, a second step of authorization may include the transaction processing system (110) determining that the transaction is authorized by communicating the $D_{PAN}$ (104) and, in some non-limiting embodiments or aspects, transaction data, to issuer system (114) for authorization of the transaction. If issuer system (114) authorizes the transaction, an authorization response message is generated and communicated to the transaction processing system (110), which then processes the transaction.

In non-limiting embodiments or aspects, the transaction processing system (110) determines that the transaction is authorized based at least partially on the device profile of the appliance (102). For example, in non-limiting embodiments or aspects, the transaction processing system (110) may determine that the transaction is authorized based at least partially on a domain restriction specified in a device profile of the appliance (102). If the transaction processing system (110) determines that a transaction request satisfies the domain restriction, the transaction may be authorized and processed. Likewise, in response to determining that a transaction request does not satisfy the domain restriction, the transaction processing system (110) may communicate a rejection to the acquirer system (112), merchant system (108), appliance (102), and/or user device (103) (not shown).

In non-limiting embodiments or aspects, multiple appliances and/or multiple device tokens may be used to engage in a transaction. For example, if a transaction request communicated from the appliance (102) is determined to not satisfy a domain restriction (e.g., the transaction value exceeds a credit limit or transaction limit), credit limits (or other domain restrictions) for multiple appliances associated with the user may be aggregated to allow for the transaction to take place. In such embodiments or aspects, transaction processing system (110) charges a first portion of the transaction value to $D_{Token}$ (106) by sending an authorization request including $D_{PAN}$ (104) to issuer system (114) for authorization, and charges a second portion of the transaction value to one or more $D_{Tokens}$ associated with one or more additional appliances. In non-limiting embodiments, the appliances themselves may determine whether a domain restriction is satisfied. For example, the appliances may be in communication with one another such that an additional appliance (i.e., an appliance other than the originally requesting appliance (102)) may communicate its domain restrictions to the appliance (102) in response to the appliance (102) determining that it is unable to request the transaction based on its domain restrictions or receiving a rejection. In other non-limiting embodiments, the domain restrictions may be determined to be applicable or not applicable by the transaction processing system (110), issuer system (114), or some other system.

In some non-limiting embodiments or aspects, the transaction processing system (110) determines that the transaction is authorized by communicating $M_{PAN}$ and, in some non-limiting embodiments or aspects, the transaction data to an issuer system (116) associated with the $M_{PAN}$. If issuer system (116) authorizes the transaction, an authorization response is communicated to the transaction processing system (110), which then processes the transaction.

In some non-limiting embodiments or aspects, when transaction processing system (110) processes a transaction initiated by appliance (102), the transaction processing system (110) generates an authorization request to deduct an amount corresponding to the transaction value and communicates the authorization request to issuer system (116). In other non-limiting embodiments or aspects, transaction processing system (110) aggregates transaction data for transactions initiated by appliance (102) over a certain time period, and generates and communicates to issuer system (116) a single authorization request to deduct an amount corresponding to the aggregated transaction amount.

Returning to FIG. 2, also illustrated is a method of processing a transaction initiated by appliance (102) according to a non-limiting embodiment or aspect. In step (s9), appliance (102) communicates a transaction request to a merchant system (108) (not shown) or acquirer system (112). The transaction request includes transaction data, the $D_{Token}$, and in some non-limiting examples, the $D_{PAN}$. In step (s10), the acquirer system (112) communicates the transaction data, the $D_{Token}$ and, in some non-limiting examples the $D_{PAN}$, to the transaction processing system (110) for validation and authorization. In step (s11), transaction processing system (110) checks token vault to verify that the $D_{Token}$ and/or $D_{PAN}$ is/are associated with an $M_{PAN}$. If the $D_{Token}$ and/or $D_{PAN}$ are associated with an $M_{PAN}$, in step (s12) an authorization request, including the $D_{PAN}$ and, in some non-limiting embodiments, transaction data, is sent to issuer system (114). If the transaction is authorized, issuer system (114) communicates an authorization response to transaction processing system (110) in step (s13). If authorized, transaction processing system (110) processes the transaction and, in step (s14), communicates an authorization response to merchant acquirer system (112) and, in some non-limiting examples, to appliance (102) and/or appliance user, for example, through a notification communicated to user device (103).

Figure 4:
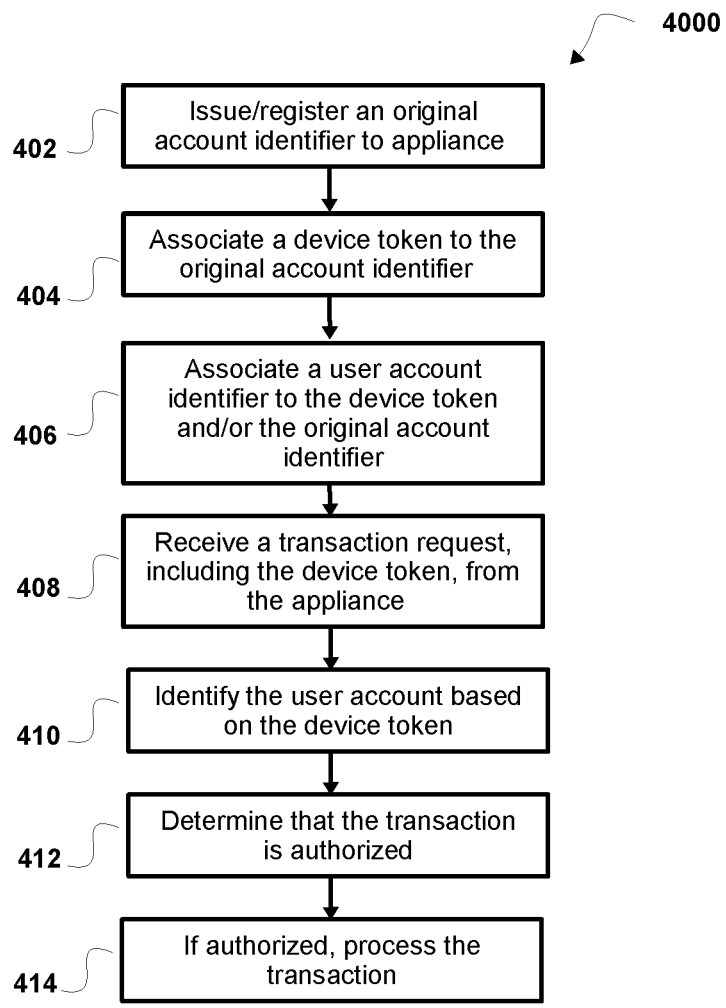
FIG. 4 is a process diagram of one embodiment or aspect of a method for authorizing and provisioning a token to an appliance to process a transaction.

Referring now to FIG. 4, shown is a flow diagram of a non-limiting embodiment or aspect of a method (4000) for authorizing and provisioning a token to an appliance. One or more steps of the method (4000) may be performed partially or completely by a transaction processing system, such as described herein, although it will be appreciated that other devices and/or systems may perform one or more steps in non-limiting embodiments. As shown in FIG. 4, at step (402), an original account identifier is issued to an appliance. As described herein, the original account identifier ($D_{PAN}$) is not associated with any user or appliance owner at the time of issuance. In step (404), a device token ($D_{Token}$) is associated to the original account identifier ($D_{PAN}$). The $D_{Token}$ may be generated or may already exist. The $D_{Token}$ may be stored in memory on the appliance. In step (406), a user account identifier ($M_{PAN}$) is associated with the $D_{Token}$ and/or the $D_{PAN}$. As described above, this association can be stored in a token vault. The $M_{PAN}$ may be a distinct original account identifier for a user that exists independently of the $D_{PAN}$.

With continued reference to FIG. 4, in step (408), a transaction request, including the $D_{Token}$, is received from the appliance. In step (410), a user account, such as $M_{PAN}$ or a corresponding token, is identified based at least partially on the $D_{Token}$. Thereafter, in step (412), a determination is made as to whether the transaction is authorized. This determination is based at least partially on the $D_{PAN}$ and, in some non-limiting embodiments, at least partially on the $D_{PAN}$ and the $M_{PAN}$. In step (414), in response to determining that the transaction is authorized, the transaction is processed. For example, in response to determining that the transaction is initially authorized because the $D_{PAN}$ is associated with an $M_{PAN}$, the transaction processing system may generate and communicate an authorization request to an issuer system to obtain final authorization that the transaction can be completed.

Figure 5:
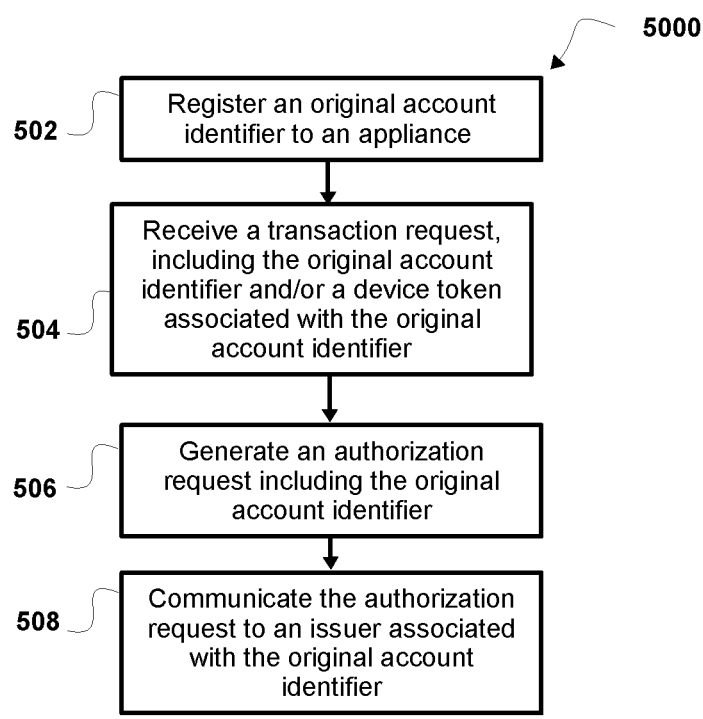
FIG. 5 is a process diagram of one embodiment or aspect of a method for authorizing and provisioning a token to an appliance to process a transaction.

Referring now to FIG. 5, shown is a flow diagram of a non-limiting embodiment or aspect of a method (5000) for authorizing an appliance to process a transaction. One or more steps of the method (5000) may be performed partially or completely by a transaction processing system, although it will be appreciated that other devices and/or systems may perform one or more steps in non-limiting embodiments. As shown in FIG. 5, at step (502), an original account identifier is issued and registered to an appliance. As described herein, the original account identifier ($D_{PAN}$) is not associated with any user or appliance owner at the time of issuance. In step (504), a transaction request is received directly or indirectly from the appliance. The transaction request includes the $D_{Token}$ and/or $D_{PAN}$ associated with the appliance. In step (506), an authorization request, including the $D_{PAN}$, is generated. In step (508), the authorization request is communicated to an issuer system associated with the $D_{PAN}$.

Also provided herein are a system and method for authorizing an appliance to receive a payment. Such a system is shown in FIG. 1 and FIG. 3 according to non-limiting embodiments and aspects. The system and method may utilize the same components as described above, including an appliance (102), an issuer system (114), and a transaction processing system (110). The components may communicate through network (101). An original $D_{PAN}$ (104) is registered to the appliance (102) by issuer system (114) and/or transaction processing system (110). The $D_{PAN}$ (104) is an original PAN that is not associated with a user or appliance owner at the time of issuance, such that the $D_{PAN}$ (104) is not issued to a human being, even though in some non-limiting embodiments the $D_{PAN}$ (104) may be subsequently linked to a user PAN. In some non-limiting embodiments or aspects, both the issuer system (114) and the transaction processing system (110) collaborate to issue the $D_{PAN}$ (104) to the appliance. In some non-limiting embodiments or aspects, registering the original account identifier includes associating a unique device identifier specific to the appliance with the $D_{PAN}$ (104). The unique device identifier specific to the appliance may be encoded into memory (105) of the appliance (102).

A method for authorizing a transaction is described above. The same components useful for authorizing a transaction may be useful for authorizing acceptance of a payment by the appliance (102). For example, and without limitation, a user may interact with appliance (102) through a user device (103), or through appliance (102) itself, to submit a payment for, e.g., rental/leasing of the appliance, or the like. As with traditional payment methods, this may involve the user, through user device (103) or directly through appliance (102) itself, communicating a payment request, including an account identifier associated with the user (i.e., an $U_{PAN}$ or broken), to appliance (102). A payment request may include $D_{PAN}$, $D_{Token}$, $U_{PAN}$, and/or $U_{Token}$. In addition, the payment request may include payment data, such as, for example and without limitation, payment amount, payment date, payment time, payment location, merchant identifier(s), identification of product(s)/service(s) being purchased, appliance information (e.g., a unique device identifier, a device profile, etc.) and/or the like.

Appliance (102) communicates the payment request to merchant system (108) and/or acquirer system (112), which may be, for example and without limitation, associated with a rental car company or other leasing or rental agency. The acquirer system (112) then communicates the payment request to the transaction processing system (110) to validate the payment request and receive authorization to process the payment. The transaction processing system (110) determines that the payment is authorized by communicating $U_{PAN}$ and/or $U_{Token}$ and, in some non-limiting embodiments or aspects the payment data, to an issuer system (116) associated with the $U_{PAN}$ and/or $U_{Token}$. If issuer system (116) authorizes the payment, an authorization response is communicated to the transaction processing system (110), which then processes the payment. In non-limiting embodiments or aspects, transaction processing system (110) communicates the authorization to appliance (102), merchant system (108), acquirer system (112), and/or user device (103). As described above, in non-limiting embodiments or aspects, the authorization by the transaction processing system may be a two-step authorization, whereby in a first step the transaction processing system (110) may conduct a check of the $D_{Token}$ (106) and/or $D_{PAN}$ (104) in the token vault (118), and, in response to determining that the $D_{Token}$ (106) and/or $D_{PAN}$ (104) are associated with an $M_{PAN}$ (e.g., an account identifier associated with a rental car company, leasing agency, or the like) in the token vault (118), the transaction processing system (110) may determine that the payment is authorized. In a second authorizing step, the transaction processing system may communicate the $U_{PAN}$ and/or broken and, in some non-limiting embodiments or aspects the payment data, to an issuer system (116) associated with the $U_{PAN}$ and/or $U_{Token}$, as described above. In further non-limiting embodiments or aspects, the transaction processing system (110), issuer system (114), and/or appliance (102) itself, determine that a payment request satisfies a domain restriction associated with the appliance prior to authorization and processing of the payment by the transaction processing system (110).

In some non-limiting embodiments or aspects, when transaction processing system (110) processes a payment request received by appliance (102), the transaction processing system (110) generates an authorization request to deduct an amount corresponding to the payment value and communicates the authorization request to issuer system (114). This deducted amount is deposited with an issuer system associated with the $M_{PAN}$ stored in the token vault (118). In other non-limiting embodiments or aspects, transaction processing system (110) aggregates payment data for payments received by appliance (102) over a certain time period, and generates and communicates to issuer system (114) a single authorization request to deduct an amount corresponding to the aggregated payment amount, and to deposit the aggregated payment amount with an issuer system associated with the $M_{PAN}$ stored in the token vault (118).

Further provided herein is an appliance for conducting transactions without the need for a user-specific account. With reference back to FIG. 1, the appliance (102) includes memory (105) internal to the appliance (102) storing a $D_{PAN}$ (104) not associated with any user and/or a $D_{Token}$ (106) uniquely associated with the device account identifier, a communication device, and a processor in communication with the memory and the communication device, the processor being programmed or configured to generate a transaction request including at least one of the $D_{PAN}$ (104) and $D_{Token}$ (106). In non-limiting embodiments or aspects, the appliance processor is programmed or configured to communicate a transaction request to a transaction processing system, receive a rejection of the transaction request, and in response, generate a new transaction request including at least one of the $D_{PAN}$ (104) and $D_{Token}$ (106), and at least one other $D_{PAN}$ or $D_{Token}$ associated with at least one other appliance, and communicate the new transaction request to the transaction processing system.

Appliance Credit Score

Figure 6:
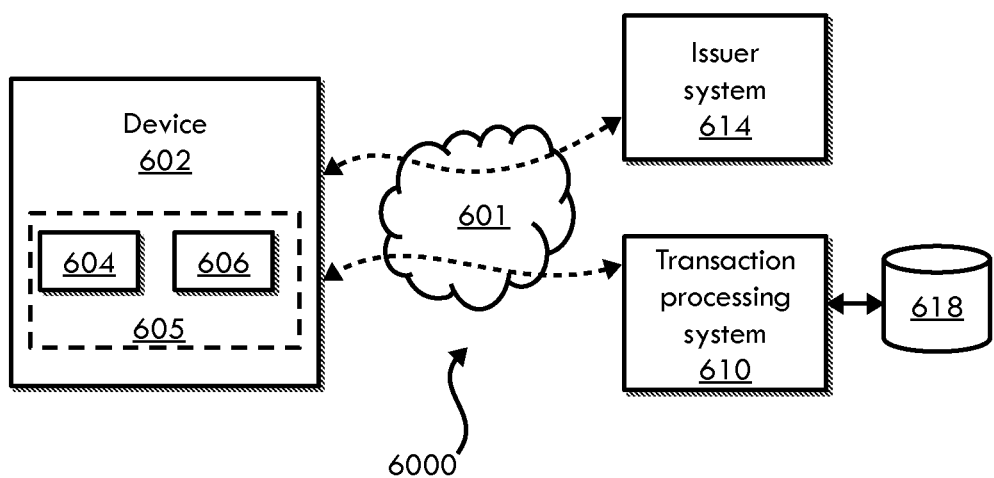
FIG. 6 is a schematic diagram of one embodiment or aspect of a method and system for authorizing and provisioning a token to an appliance.

Also provided herein are systems and methods for determining and assigning a credit score to an appliance, for example, and without limitation, appliances having $D_{PANs}$ and $D_{Tokens}$ as described herein. With reference to FIG. 6, which shows a system (6000) for authorizing and provisioning a token to an appliance (602), the appliance (602) includes memory (605), including a $D_{PAN}$ (604) and $D_{Token}$ (606) as described previously. The system (6000) further includes an issuer system (614), and a transaction processing system (610). The components may communicate through a network (601). During the manufacture of the appliance, or thereafter, the original device personal account number ($D_{PAN}$) (604) is registered to the appliance (602) by issuer system (614) and/or transaction processing system (610). The $D_{PAN}$ (604) may be an original PAN that is not associated with a user or appliance owner at the time of issuance, such that the $D_{PAN}$ (604) is not issued to a human being, although in some non-limiting embodiments the $D_{PAN}$ (604) may be subsequently linked to a user PAN ($M_{PAN}$). In some non-limiting embodiments or aspects, both the issuer system (614) and the transaction processing system (610) collaborate to issue the $D_{PAN}$ (604) to the appliance. In some non-limiting embodiments or aspects, registering the original account identifier includes associating a unique device identifier specific to the appliance with the $D_{PAN}$ (604). The unique device identifier specific to the appliance may be encoded into memory (605) of the appliance (602).

With further reference to FIG. 6, in non-limiting embodiments or aspects, the appliance (602) may be provisioned with the $D_{PAN}$ (604) for making transactions. However, in other non-limiting embodiments, the appliance may be provisioned with a device token ($D_{Token}$) (606) instead of or in addition to the $D_{PAN}$ (604). For example, a $D_{Token}$ (606) may be provisioned on the appliance (602) so as to not expose the $D_{PAN}$ (604) to any potential security vulnerabilities. It will be appreciated that, although FIG. 6 illustrates both the $D_{Token}$ (606) and $D_{PAN}$ (604), non-limiting embodiments may include just the $D_{Token}$ (606) or just the $D_{PAN}$ (604).

Still referring to FIG. 6, in non-limiting embodiments or aspects in which the appliance (602) is provisioned with the $D_{Token}$ (606), the transaction processing system (610) tokenizes the $D_{PAN}$ (604) by generating the $D_{Token}$ (606) and associating the $D_{Token}$ (606) with the $D_{PAN}$ (604). The associated $D_{PAN}$ (604) and $D_{Token}$ (606) are stored in a token vault (618) which, in non-limiting embodiments, includes a secure database. As described below, token vault (618) can, in non-limiting embodiments or aspects, be a cloud-based token vault. As used herein, "cloud-based token vault" means that at least one portion of the tokenization process is hosted by a system that is independent of, and physically and/or logically separated from, a transaction processing system that typically houses a token vault. For example, and without limitation, in non-limiting embodiments or aspects, a vault that stores a mapping of $D_{Token}(s)$ to $M_{Token(s)}$ is a cloud-based vault that is separate from the vault storing the association of tokens to PANS. In non-limiting embodiments or aspects, a step of checking that a token is activated (e.g., that a $D_{Token}$ is mapped to an $M_{Token}$) is carried out by querying the cloud-based token vault. In non-limiting embodiments or aspects, the mapping of token(s) to PAN(s) is stored with the transaction processing system and/or issuer system, in a token vault. In non-limiting embodiments or aspects, both the mapping of $D_{Token(s)}$ to $M_{Token(s)}$ and the mapping of the token(s) to the PAN(s) are stored on a cloud-based vault, separately from a transaction processing system and/or issuer system token vault.

With continuing reference to FIG. 6, at this stage, the $D_{PAN}$ (604) and $D_{Token}$ (606) are associated with each other in a token vault. The transaction processing system (610) and/or issuer system (614) communicates $D_{Token}$ (606) to the appliance (602) for storage thereon. At this stage, the $D_{Token}$ (606) resides on the appliance (602) in an active or inactive state. Transaction processing system (610) can activate the $D_{Token}$ (606) at any appropriate time, for example at completion of manufacture, upon sale of the appliance, or the like. Appliance (602) may then be purchased, rented, or leased by a user.

Regardless of whether the appliance (602) is provisioned with the $D_{Token}$ (606), in non-limiting embodiments or aspects, the appliance (602) is assigned an appliance credit score by the issuer system (614), the transaction processing system (610), both systems working in collaboration, and/or any other device or system.

The appliance credit score may be based on, for example and without limitation, one or more device parameters such as a unique identifier (e.g., a device identifier), an appliance type, an appliance model, an appliance manufacturer, an appliance transaction history, an appliance age, an appliance use time, an appliance service history, and/or combinations thereof. In some non-limiting examples or embodiments, the device profile may be a set of device parameters, a score or rating generated from a set of device parameters, and/or a predefined profile category. In non-limiting embodiments or aspects, the credit score is, in addition to or instead of the above-identified parameters, based at least partially on at least one of appliance serial number, time used, energy used, energy efficiency, appliance location, whether use of the appliance is commercial, personal, or any combination thereof. The appliance credit score may be associated with the $D_{Token}$ (604) and/or $D_{PAN}$ (606) in a database, for example, and without limitation, a database stored by a third party (e.g., not the transaction processing system (610) or the issuer system (614)).

In non-limiting embodiments or aspects, the parameters identified above are provided to the issuer system (614), transaction processing system (610), and/or other suitable system or device by an appliance user/owner or other individual. In non-limiting embodiments or aspects, user/owner or other individual obtains, with a device, the parameters from machine-readable indicia associated with the appliance, such as a barcode (e.g., a two-dimensional barcode, a three-dimensional barcode, a QR code, or the like), an RFID transponder, and transmits the parameters to transaction processing system (610), issuer system (614), and/or other suitable system or device. In non-limiting embodiments or aspects, the parameters are obtained automatically from the appliance through known communication methods (Wi-Fi, Bluetooth, GSM and/or the like) or when queried by the issuer system (614), transaction processing system (610), and/or other suitable system or device.

In non-limiting embodiments or aspects, the appliance credit score is updated one or more times throughout the life of the appliance.

With further reference to FIG. 6, transaction processing system (610), issuer system (614), and/or other suitable system or device generates the credit score based on an algorithm such as a function including one or more of the above-identified parameters. In non-limiting embodiments or aspects, the credit score is generated by an independent entity, for example and without limitation an entity unaffiliated with the issuer or transaction processor. In non-limiting embodiments or aspects the transaction processing system (610), issuer system (614), and/or other suitable system or device generates at least one weighted value from at least one of the parameters. Various weights can be assigned to any of the parameters. The applicable system or device then generates an aggregate credit score based on the at least one weighted value. In non-limiting embodiments or aspects, the applicable system compares the at least one weighted value to at least one weighted value obtained from at least one other appliance and generates, at least partially based on the comparison, the credit score for the appliance (602). In non-limiting embodiments or aspects, the at least one other appliance is matched to appliance (602) based on one or more of the above-identified parameters. For example, and without limitation, in non-limiting embodiments or aspects, the applicable system compares at least one weighted value for appliances based on appliance manufacturer, appliance location, and/or whether the appliance is or will be used for commercial or personal use.

In non-limiting embodiments or aspects, the appliance (602) is an automobile. In non-limiting embodiments or aspects, the credit score for the automobile is based at least partially on, in addition to or in place of the above-identified device parameters, the following device parameters: vehicle identification number (VIN), year of manufacture, make, model, miles driven, number of trips, number of days in operation, fuel consumption, engine size, fuel efficiency, geographic location of use, geographic rating, earning capacity, hybrid compatibility of the automobile, whether the automobile can be upgraded, automobile rating, whether one or more airbags have been deployed, collision probability, or any combination thereof.

In non-limiting embodiments or aspects, as described above, the parameters identified above are provided to the issuer system (614), transaction processing system (610), and/or other suitable system or device by the automobile user/owner or other individual. In non-limiting embodiments or aspects, user/owner or other individual obtains, with a device, the parameters from machine-readable indicia associated with the automobile, such as a barcode (e.g., a two-dimensional barcode, a three-dimensional barcode, a QR code, or the like), an RFID transponder, and transmits the parameters to transaction processing system (610), issuer system (614), and/or other suitable system or device. In non-limiting embodiments or aspects, the parameters are obtained automatically from the automobile through known communication methods (Wi-Fi®, Bluetooth®, GSM, and the like) or when queried by the issuer system (614), transaction processing system (610), and/or other suitable system or device. In non-limiting embodiments or aspects, the parameters are obtained, by a user, automatically, or when queried, from an on-board diagnostic processor associated with the automobile.

In non-limiting embodiments or aspects, the automobile credit score is updated one or more times throughout the life of the automobile.

In non-limiting embodiments or aspects, the transaction processing system (610), issuer system (614), or other suitable system or device generates the automobile credit score based on an algorithm including one or more of the parameters. In non-limiting embodiments or aspects, when the credit score is based on a comparison of at least one weighted parameter with at least one weighted parameter obtained from at least one other automobile, the at least one other automobile is matched to automobile (602) based on one or more of the above-identified parameters. For example, and without limitation, in non-limiting embodiments or aspects the applicable system that generates the credit score compares at least one weighted value for automobiles based on make, model, model year, geographic location, service history, airbag deployment, and/or whether the appliance is or will be used for commercial or personal use.

Virtual Account Setup and Appliance Retrofit

Figure 7:
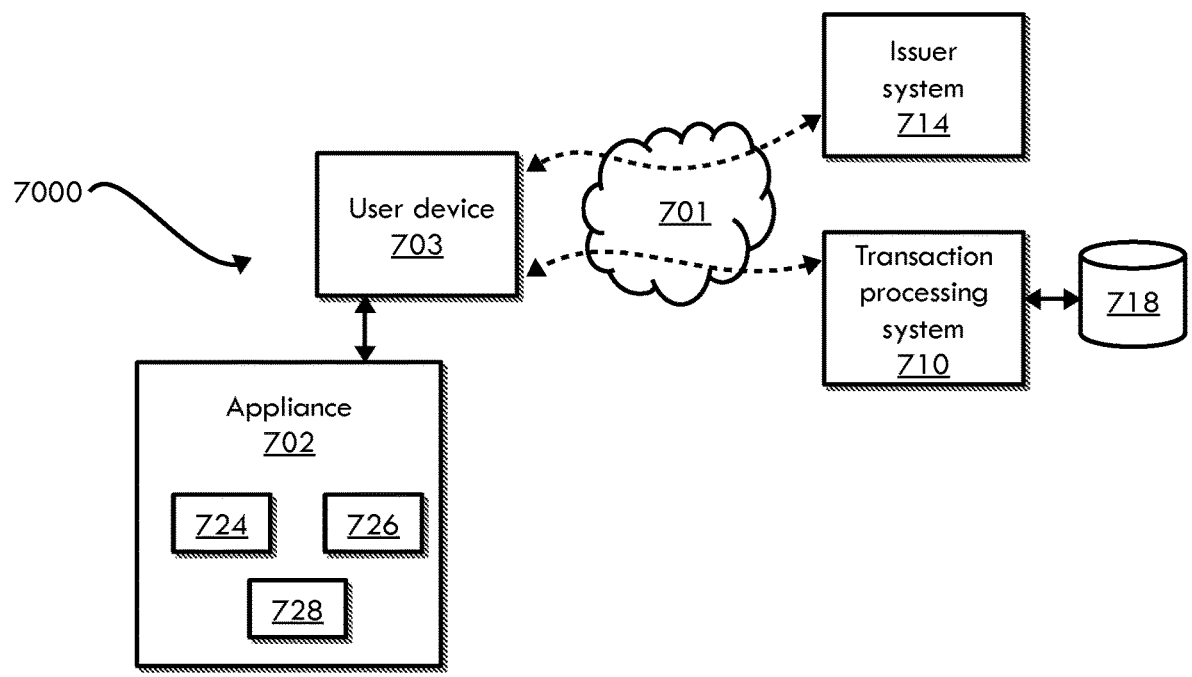
FIG. 7 is a schematic diagram of one embodiment or aspect of a method and system for authorizing and provisioning a token to an appliance.

While technological developments in the Internet of Things have enabled smart appliances to transact with merchants over a network, there is a need to allow older appliances, which lack on-board processors, memory, and/or communications devices to transact with merchants or allow an owner, user, renter, or lessee of such appliances to transact with merchants. Accordingly, also provided herein are a system and method for setting up a virtual account for an appliance and retrofitting the same for engaging in transactions. FIG. 7 illustrates a system to set up a virtual account for an appliance according to one non-limiting embodiment or aspect. In FIG. 7, a system (7000) includes an appliance (702), a user device (703), an issuer system (714), and a transaction processing system (710). The user device (703) may be any type of client device that allows a user to interact with the appliance (702), transaction processing system (710), and/or issuer system (714), for example, and without limitation, a smartphone, tablet, a computing device, a remote control, or the like. User device (703) may communicate with transaction processing system (710) and/or issuer system (714) through a network (701).

During the manufacture of the appliance, or thereafter, machine-readable indicia (724), such as a barcode (e.g., a two-dimensional barcode, a three-dimensional barcode, a QR code, or the like), an RFID transponder, or the like that user device (703) can read and transmit to transaction processing system (710) and/or issuer system (714) can be applied to the appliance (702) or provided to the purchaser of the appliance (702) for application thereto. Machine-readable indicia (724) can, in some non-limiting embodiments or aspects, include a website address link that, when scanned by a user device, such as a smartphone, tablet, computing device, remote control, or the like, directs the device to a webpage to allow the user to set up and configure a virtual account for the appliance (702). In some non-limiting embodiments or aspects, the link is an encrypted link, and requires an encryption key, which is delivered to the user separately, and in some non-limiting embodiments or aspects with default log-in credentials. In some non-limiting embodiments or aspects, in addition to a link to the virtual account, machine-readable indicia can include a unique device identifier associated with the appliance (702). In some non-limiting embodiments or aspects, a biometric input is required for a user to set up a virtual account associated with appliance (702), and future log-in attempts can require matching biometric input.

Machine-readable indicia (724) can be applied to any convenient location on appliance (702). In non-limiting embodiments or aspects in which appliance (702) is an automobile, machine-readable indicia (724) can be applied to an exterior surface, to allow reading of the indicia by merchants, service providers, and/or the like without the need to stop the vehicle or for a user to exit the vehicle.

In some non-limiting embodiments or aspects, at the time of manufacture of the appliance (702), or thereafter, an original device personal account number ($D_{PAN}$) is registered to the appliance (702) by issuer system (714) and/or transaction processing system (710). The $D_{PAN}$ can be an original PAN that is not associated with a user or appliance owner at the time of issuance, such that the $D_{PAN}$ is not issued to a human being, even though in some non-limiting embodiments the $D_{PAN}$ may be subsequently linked to a user PAN, as described above. In some non-limiting embodiments or aspects, both the issuer system (714) and the transaction processing system (710) collaborate to issue the $D_{PAN}$ to the appliance (702). In some non-limiting embodiments or aspects, registering the original account identifier includes associating a unique device identifier specific to the appliance with the $D_{PAN}$. The unique device identifier specific to the appliance may be encoded into the machine-readable indicia (724) of the appliance (702). As described previously, an owner or user of appliance (702) can link an account identifier associated with an electronic payment device issued to the user (e.g., a credit or debit card) ($M_{PAN}$) to the appliance (702) and/or $D_{PAN}$. In some non-limiting embodiments or aspects, this linking of the $M_{PAN}$ to the $D_{PAN}$ must occur prior to any transaction being conducted with the $D_{PAN}$, such that the user is ultimately responsible for the transactions initiated using the $D_{PAN}$ while activated for that particular user. In some non-limiting embodiments or aspects, the mapping of the $M_{PAN}$ to the appliance (702) or appliance $D_{PAN}$ is stored in a token vault (718), as described previously or cloud-based vault as described below. In some non-limiting embodiments or aspects, machine-readable indicia (724) includes a $D_{Token}$ that transaction processing system (710) and/or issuer system (714) maps to $D_{PAN}$ or $M_{PAN}$. This mapping can be stored in a token vault (718), as described previously.

In non-limiting embodiments or aspects, $D_{PAN}$ is activated upon initial use of appliance (702) or upon a user selection to undergo an activation process. The user may be prompted, after scanning machine-readable indicia (724) with user device (703), to, through user device (703), communicate ownership or possession of appliance (702) to transaction processing system (710) and/or issuer system (714). In some non-limiting embodiments or aspects, machine-readable indicia (724) includes default log-in credentials to allow a user to set up a virtual account, linking $D_{PAN}$ to $M_{PAN}$. As described above, for increased security in some non-limiting embodiments or aspects the default credentials are communicated to the user outside of the machine-readable indicia. In some non-limiting embodiments or aspects, upon use of the default credentials, the transaction processing system (710) and/or issuer system (714) will require the user to select new credentials for accessing the virtual account.

In some non-limiting embodiments or aspects, user device (703) transmits the $D_{Token}$, the unique device identifier associated with the appliance (702), and/or a unique identifier associated with user device (703) to transaction processing system (710) and/or issuer system (714). In some non-limiting embodiments or aspects, in response to an activation request initiated by a user, transaction processing system (710) and/or issuer system (714) maps $M_{PAN}$ to the appliance (702). In some non-limiting embodiments or aspects, transaction processing system (710) and/or issuer system (714), in response to an activation request initiated by the user, maps $M_{PAN}$ to the $D_{PAN}$ of appliance (702). In some non-limiting embodiments or aspects, transaction processing system (710) and/or issuer system (714), in response to an activation request initiated by the user, maps $M_{PAN}$ to the $D_{PAN}$ and $D_{Token}$ of appliance (702).

In some non-limiting embodiments or aspects, once user has accessed the virtual account, the user can configure any number of account settings, including a device profile or various domain restrictions associated with the appliance (702), as described previously. Domain restrictions can include those identified above, and can also include, in non-limiting embodiments or aspects, an account setting (activated—payments enabled; inactive—appliance or appliance $D_{Token}$ and/or $D_{PAN}$ linked to an $M_{PAN}$ but not authorized for payments; or deactivated—appliance or appliance $D_{Token}$ and/or $D_{PAN}$ not linked to an $M_{PAN}$), use restrictions (e.g., where appliance (702) is an automobile, use restrictions can include velocity limits, amount limits, geography limits, and/or the like), merchant domain restrictions (described previously), and/or access point restrictions. In non-limiting embodiments or aspects, access point restrictions can allow the user to restrict or permit additional devices, other than user device (703), to be utilized to access the virtual account associated with appliance (702). In non-limiting embodiments or aspects, a user, once the virtual account has been accessed, can set up, change, and/or revoke a merchant whitelist (and merchants on such a whitelist), domain restrictions, access point restrictions, bill pay and payment details, account status (e.g., activated, inactive, deactivated), and/or fraud settings. A user may also access the virtual account and view a list of attempted and/or completed transactions in which the appliance (702) was utilized.

Figure 8:
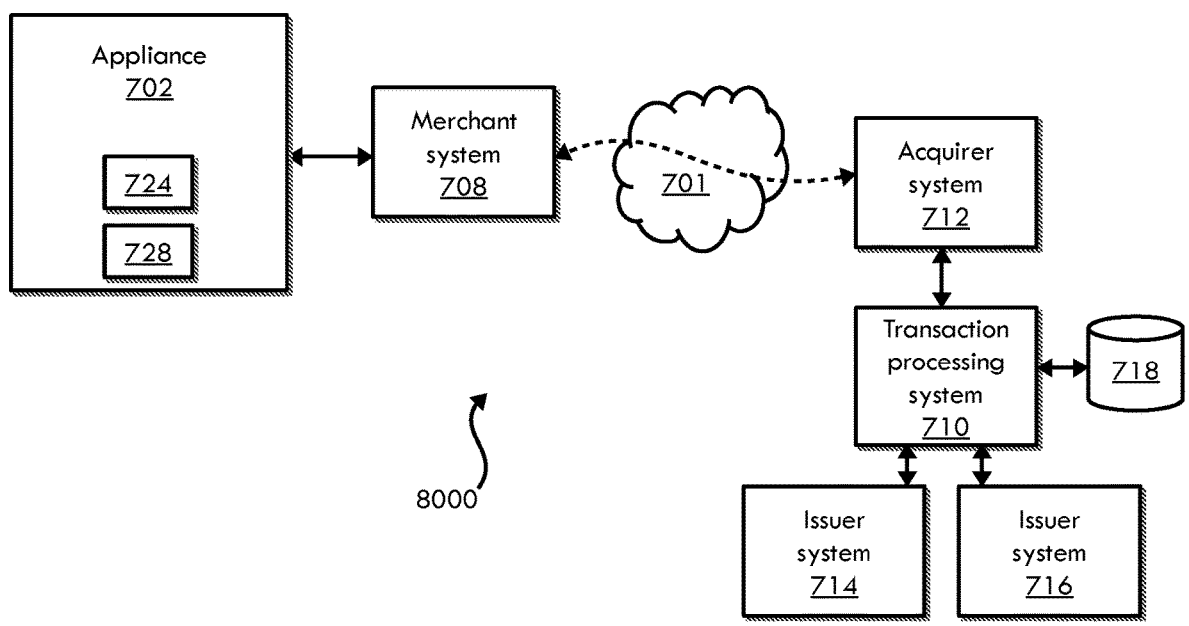
FIG. 8 is a schematic diagram of one embodiment or aspect of a method and system for authorizing and provisioning a token to an appliance to process a transaction.

FIG. 8 illustrates a system (8000) to process a transaction using a $D_{Token}$, $D_{PAN}$, and/or or $M_{PAN}$ associated with appliance (702) according to a non-limiting embodiment or aspect. In FIG. 8, the system (8000) includes an appliance (702), a merchant system (708), an acquirer system (712), an issuer system (714), and a transaction processing system (710). Merchant system (708) may communicate with appliance (702) through machine-readable indicia (724). Other components in system (8000) may communicate through network (701).

With reference to FIGS. 7 and 8, in non-limiting embodiments or aspects, machine-readable indicia (724) is the same machine-readable indicia that was used to set up the virtual account for appliance (702). In non-limiting embodiments or aspects, a separate machine-readable indicia (728), different from the indicia used to set up the virtual account, is utilized by merchants, service providers, and/or the like for conducting transactions with appliance (702). In non-limiting embodiments or aspects, separate machine-readable indicia (728) can differ visually, for example and without limitation, by differences in color.

When making a transaction, the merchant system, using a device capable of reading machine-readable indicia, communicates a transaction request, that may include information obtained from machine-readable-indicia (e.g., $D_{Token}$, device identifier, and/or $D_{PAN}$), and in some non-limiting embodiments, transaction data, to the acquirer system (712), such as an acquiring bank's system. The transaction data may include, for example and without limitation, transaction value, transaction date, transaction time, transaction location, merchant identifier(s), identification of product(s)/service(s) being purchased, appliance information (e.g., a unique device identifier, a device profile, etc.) and/or the like. The acquirer system (712) then communicates the transaction request, including in some non-limiting embodiments or aspects $D_{Token}$, $D_{PAN}$, and/or $M_{PAN}$, to the transaction processing system (710) to validate the transaction request and receive authorization to process the transaction. Such authorization may proceed in a two-step process, as described previously and briefly summarized below.

First, in non-limiting embodiments or aspects, the transaction processing system (710) may conduct a check of the information stored in the token vault (718) and, in response to determining that the appliance (702), $D_{Token}$, and/or $D_{PAN}$ are associated with an $M_{PAN}$ in the token vault (718), the transaction processing system (710) may determine that the transaction is authorized. Determining that the transaction is authorized may also include checking any domain restrictions associated with the $D_{PAN}$ or appliance (as set up by user), verifying that the $D_{PAN}$ and/or $M_{PAN}$ is valid and can be used for the transaction, and/or the like. In some non-limiting embodiments or aspects, determining that the transaction is authorized includes checking if a unique device identifier included in the transaction request matches a unique identifier associated with the $M_{PAN}$, appliance (702), and/or $D_{PAN}$. If the transaction is determined to be authorized, transaction processing system (710) processes the transaction.

In non-limiting embodiments or aspects, a second step of authorization may include the transaction processing system (710) determining that the transaction is authorized by communicating the $D_{Token}$, $D_{PAN}$, and/or $M_{PAN}$ and, in some non-limiting embodiments or aspects, transaction data, to issuer system (714) for authorization of the transaction. If issuer system (714) authorizes the transaction, an authorization response message is generated and communicated to the transaction processing system (710), which then processes the transaction.

In non-limiting embodiments or aspects, authorization (a first or second step) can include a two-factor authentication, such as a message communicated to user device (not shown) from transaction processing system (710) and/or issuer system (714) with which the virtual account was registered and set up, and/or any additional device(s) authorized by the user. In some non-limiting embodiments or aspects, a transaction may not be processed until a user, through the user device or other authorized device, responds to the message transmitted from transaction processing system (710) and/or issuer system (714). In some non-limiting embodiments or aspects, when user authorizes the transaction through two-factor authentication, user is given the option to whitelist the merchant such that future transactions with that merchant do not require two-factor authentication in order to be authorized.

In non-limiting embodiments or aspects, the transaction processing system (710) determines that the transaction is authorized based at least partially on the device profile of the appliance. For example, in some non-limiting embodiments or aspects, the transaction processing system (710) may determine that the transaction is authorized based at least partially on a domain restriction specified in a device profile associated with the appliance (702), and, in some non-limiting embodiments, stored in token vault (718). If the transaction processing system (710) determines that a transaction request satisfies the domain restriction, the transaction may be authorized and processed. Likewise, in response to determining that a transaction request does not satisfy the domain restriction, the transaction processing system (710) may communicate a rejection to the acquirer system (712), merchant system (708), and/or user device (not shown).

In some non-limiting embodiments or aspects, when transaction processing system (710) processes a transaction involving appliance (702), the transaction processing system (710) generates an authorization request to deduct an amount corresponding to the transaction value and communicates the authorization request to issuer system (716). In other non-limiting embodiments or aspects, transaction processing system (710) aggregates transaction data for transactions involving appliance (702) over a certain time period, and generates and communicates to issuer system (716) a single authorization request to deduct an amount corresponding to the aggregated transaction amount. In some non-limiting embodiments or aspects, the time period is a rental or lease period associated with the appliance. In some non-limiting embodiments or aspects, the time period is a billing cycle associated with a $D_{PAN}$. In some non-limiting embodiments or aspects, a user may be required to access the virtual account associated with the appliance (702) and to submit a payment for one or more transactions initiated with appliance (702).

Figure 9:
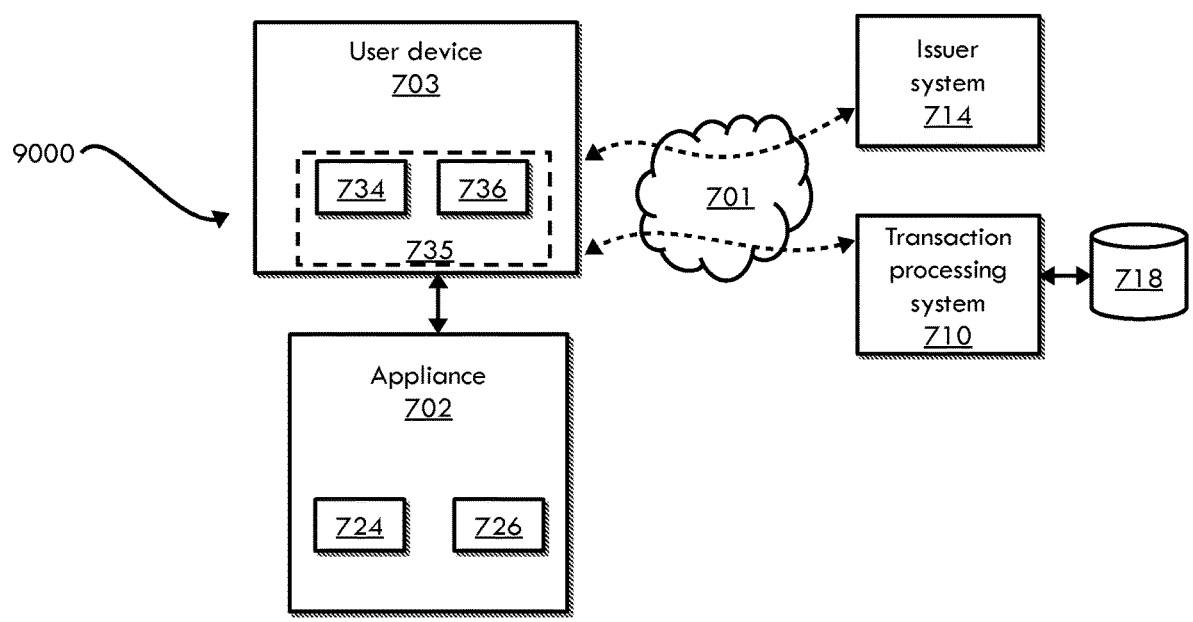
FIG. 9 is a schematic diagram of one embodiment or aspect of a method and system for authorizing and provisioning a token to an appliance.

With reference to FIG. 9, in some non-limiting embodiments or aspects, in addition to, or in place of, machine-readable indicia (724), appliance (702) can be retrofitted with a communication device (726). For example, and without limitation, retrofitted communication device (726) can be a Bluetooth device that is capable of communicating with user device (703). In non-limiting embodiments or aspects, appliance (702) is an automobile and the communication device (726) is a Bluetooth device. Similar to the process for machine-readable indicia (724) described above, upon powering-on of the communication device (726) and pairing or otherwise linking user device (703) to communication device (726), user device (703) can be used to set up a virtual account for appliance (702). In addition to setting up a $D_{Token}$ and/or $D_{PAN}$ and associating the same with an $M_{PAN}$, or associating an $M_{PAN}$ with appliance (702), linkage of the communication device (726) with a user device (703), and communication between devices possible with such a configuration, allows for transmission of a $D_{Token}$ from the communication device (726) to user device (703), and association of $D_{Token}$ with a master token ($M_{Token}$) associated with the $M_{PAN}$ and present on user device (703) to allow for the user to conduct transactions with the $D_{Token}$, avoiding the need to repeatedly transmit the user's $M_{Token}$ during transactions, reducing or eliminating unnecessary exposure of the $M_{Token}$ to potential fraudsters. In non-limiting embodiments or aspects, as will be described below, the $D_{Token}$ is not transferred to user device (703). Instead, communication device (726) stores $D_{Token}$, and user device (703), which can be linked or paired to communication device (726), instructs communication device (726) to transmit $D_{Token}$ during transactions.

In some non-limiting embodiments or aspects, a first step is setting up a virtual account for the appliance (702). As described previously, an owner of appliance (702) can, at the time of purchase or thereafter, apply and scan machine-readable indicia (724) to the appliance (702) and scan the indicia (724) with a device (703), allowing the owner to set up the virtual account for the appliance (702), and to configure various settings as desired. Setting up the virtual account for the appliance (702) allows for mapping by transaction processing system (710), issuer system (714), and/or other system of $D_{Token}$ to $M_{Token}$. As described above, machine-readable indicia (724) can include a device identifier for appliance (702). In non-limiting embodiments or aspects, communication device (726) includes a device identifier for appliance (702). In non-limiting embodiments or aspects, the owner of appliance (702) provides a device identifier associated with the appliance (702) to the communication device (726) during setup.

In some non-limiting embodiments or aspects, once the virtual account for device (702) has been set up, appliance (702) can be rented, leased, and/or possession thereof may otherwise be transferred for some period of time. In some non-limiting embodiments or aspects, appliance (702) may be a rental car. A renter can, with a user device (703) having memory (735), scan machine-readable indicia (724). In non-limiting embodiments or aspects, as described above, machine-readable indicia (724) can be a different machine-readable indicia than that used to set up the virtual account for appliance (702). Scanning of machine-readable indicia can occur through any known application or, in some non-limiting embodiments or aspects, can occur through a mobile application associated with the rental agency or owner of the vehicle. Once machine-readable indicia (724) is scanned, transaction processing system (710) and/or issuer system (714) can, in some non-limiting embodiments through the mobile application, request access to the $M_{Token}$ (734) present on user device (703) and map $D_{Token}$ to the $M_{Token}$ (734), and, in some non-limiting embodiments or aspects, the mapping can be stored in token vault (718). In some non-limiting embodiments or aspects, once the mapping has been performed, user device (703) can pair with or otherwise link to communication device (726). In non-limiting embodiments or aspects, pairing or otherwise linking user device (703) with communication device (726) causes $D_{Token}$ (736) to be transferred to user device (703), allowing a renter to conduct transactions with $D_{Token}$ (736) rather than $M_{Token}$ (734), reducing exposure of the renter's $M_{Token}$ (734). As described previously, during the setup process, or thereafter, appliance owner can configure a device profile or provide restrictions, such as domain restrictions, that limit the types of transactions, locations of transactions, or amounts of transactions for which $D_{Token}$ can be used. For example and without limitation, in the case of a rental car, the owner can configure domain restrictions such that $D_{Token}$ can only be used to pay for fuel, tolls, and/or other items/services associated with use of a vehicle. Moreover, by pairing user device (703) with communication device (726) to allow usage of the $D_{Token}$ to conduct transactions, the renter or lessee can take advantage of any of the domain restrictions associated with the appliance, such as, for example and without limitation, a credit or transaction limit.

Figure 10:
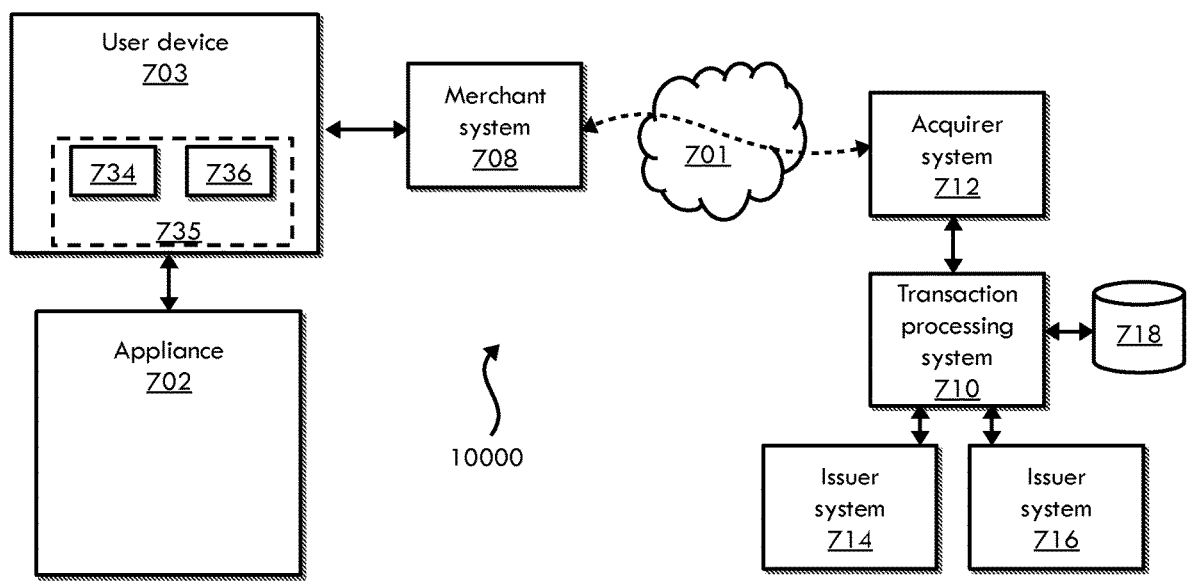
FIG. 10 is a schematic diagram of one embodiment or aspect of a method and system for authorizing and provisioning a token to an appliance to process a transaction.

FIG. 10 illustrates a system (10000) to process a transaction using a $D_{Token}$, associated with appliance (702) according to a non-limiting embodiment or aspect. In FIG. 10, the system (10000) includes a user device (703) onto which $D_{Token}$ (736) has been transferred following pairing or linking of user device (703) with communication device of appliance (702) as described above. System (10000) also includes a merchant system (708), an acquirer system (712), an issuer system (714), and a transaction processing system (710). User device (703) may communicate with merchant system (708) through any known communication method. In non-limiting embodiments or aspects, user device communicates with merchant system (708) through a mobile application associated with the owner of the appliance. Other components in system (10000) may communicate through network (701).

When making a transaction, the user device communicates $D_{Token}$ and, in some non-limiting embodiments, device identifier associated with the appliance, to merchant system (708). Merchant system (708) communicates $D_{Token}$ (736) and, in some non-limiting embodiments, device identifier and transaction data, to the acquirer system (712), such as an acquiring bank's system. The transaction data may include, for example and without limitation, transaction value, transaction date, transaction time, transaction location, merchant identifier(s), identification of product(s)/service(s) being purchased, appliance information (e.g., a unique device identifier, a device profile, etc.) and/or the like. The acquirer system (712) then communicates the transaction request, including, in some non-limiting embodiments or aspects, $D_{Token}$ and, in some non-limiting embodiments, device identifier associated with the appliance, to the transaction processing system (710) to validate the transaction request and receive authorization to process the transaction. Such authorization may proceed in a two-step process, as described previously and briefly summarized below.

First, in non-limiting embodiments or aspects, the transaction processing system (710) may conduct a check of the information stored in the token vault (718) and, in response to determining that the $D_{Token}$ (736) is associated with an $M_{Token}$ in the token vault (718), the transaction processing system (710) may determine that the transaction is authorized. Determining that the transaction is authorized may also include checking any domain restrictions associated with the $D_{Token}$, verifying that the $D_{Token}$ is valid and can be used for the transaction and/or the like. In some non-limiting embodiments, determining that the transaction is authorized includes checking if the device identifier included in the transaction request matches a unique identifier associated with the appliance and/or $D_{Token}$. If the transaction is determined to be authorized, transaction processing system (710) processes the transaction.

In non-limiting embodiments or aspects, a second step of authorization may include the transaction processing system (710) determining that the transaction is authorized by communicating the $D_{Token}$, device identifier, and/or transaction data, to issuer system (714) for authorization of the transaction. If issuer system (714) authorizes the transaction, an authorization response message is generated and communicated to the transaction processing system (710), which then processes the transaction.

In non-limiting embodiments or aspects, the transaction processing system (710) determines that the transaction is authorized based at least partially on a device profile of the appliance, which is described previously. For example, in non-limiting embodiments or aspects, the transaction processing system (710) may determine that the transaction is authorized based at least partially on a domain restriction specified in a device profile associated with the appliance, and, in some non-limiting embodiments, stored in token vault (718). If the transaction processing system (710) determines that a transaction request satisfies the domain restriction, the transaction may be authorized and processed. Likewise, in response to determining that a transaction request does not satisfy the domain restriction, the transaction processing system (710) may communicate a rejection to the acquirer system (712), merchant system (708), and/or user device (703).

In some non-limiting embodiments or aspects, when transaction processing system (710) processes a transaction involving the appliance, the transaction processing system (710) generates an authorization request to deduct an amount corresponding to the transaction value and communicates the authorization request to an issuer system (716) associated with $M_{Token}$ (734). In other non-limiting embodiments or aspects, transaction processing system (710) aggregates transaction data for transactions involving $D_{Token}$ (736) over a certain time period, and generates and communicates to issuer system (716) a single authorization request to deduct an amount corresponding to the aggregated transaction amount. In some non-limiting embodiments or aspects, a user is required to access the virtual account associated with the appliance and to submit a payment for one or more transactions entered into with $D_{Token}$ (736).

In non-limiting embodiments or aspects, the owner of the appliance, e.g. rental car, can, at a predetermined time or when the rental period has expired, remove $D_{Token}$ (736) from user device (703) and, in some non-limiting embodiments through transaction processing system (710) and/or issuer system (714), remove mapping of $D_{Token}$ (736) to $M_{Token}$ (734) in vault (718). In non-limiting embodiments or aspects, removal of $D_{Token}$ (736) from user device (703) is carried out by a mobile application associated with the appliance owner.

Figure 11:
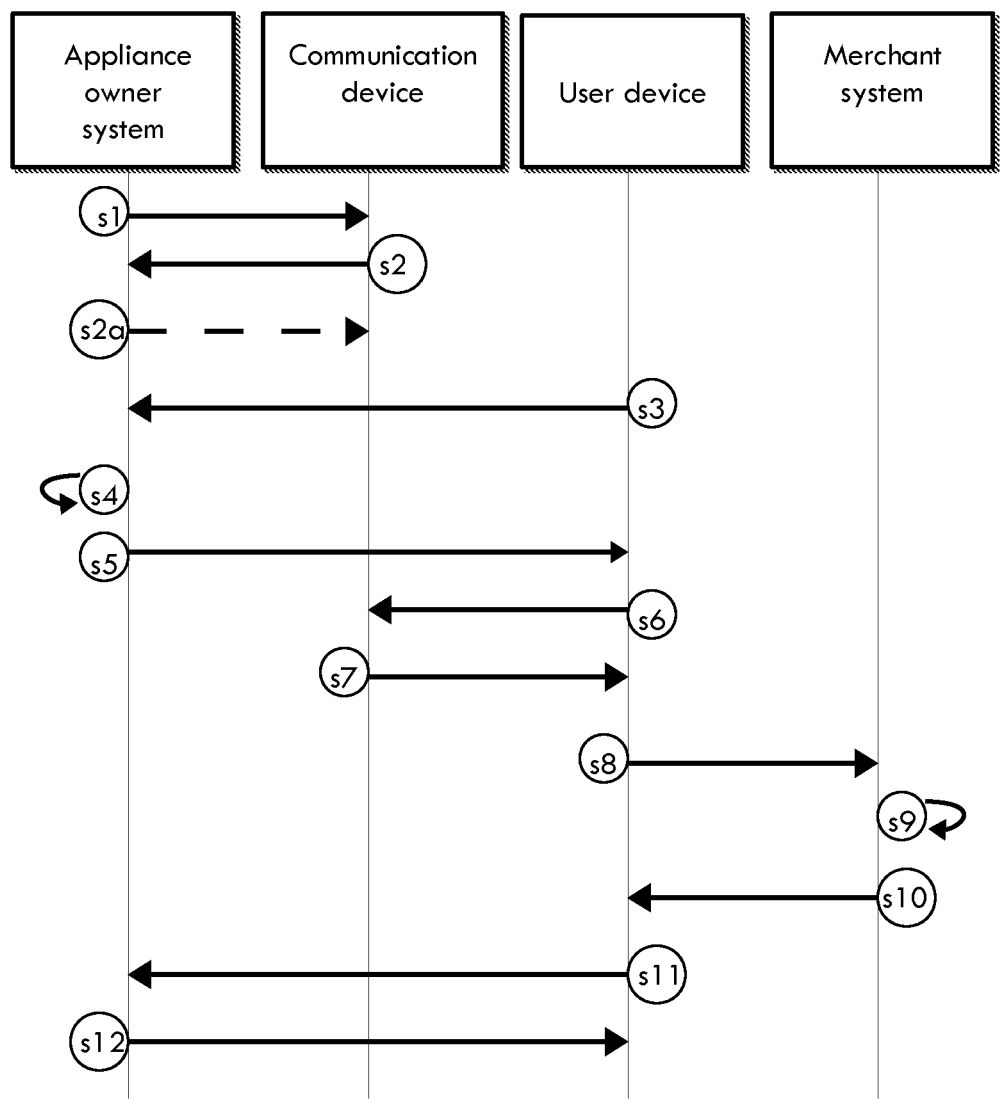
FIG. 11 is a process diagram of one embodiment or aspect of a method for authorizing and provisioning a token to an appliance to process a transaction.

With reference to FIG. 11, illustrated is a method of setting up a virtual account for an appliance and conducting a transaction according to a non-limiting embodiment or aspect. In step (s1), the appliance owner, as described previously, provides a retrofitted communication device to the appliance, and, with a suitable device activates and configures the communication device for use by, for example and without limitation, renters, lessees, or the like. In some non-limiting embodiments or aspects, appliance owner scans a machine-readable indicia or otherwise obtains a code to allow appliance owner to set up/register communication device. In non-limiting embodiments or aspects, in step (s2), the communication device acknowledges activation by the appliance owner. In non-limiting embodiments or aspects, in step (s2a) (which may or may not be performed) the owner of the appliance provides a device identifier associated with the appliance to the communication device. As described previously, in non-limiting embodiments or aspects the communication device includes a device identifier, and the appliance owner need not provide the same.

In non-limiting embodiments or aspects, in step (s3) a renter or lessee initiates, with a user device, a rental or lease period, in some non-limiting embodiments through a mobile application associated with the appliance owner. In step (s4), the appliance owner system, based on the information received from the user device, communicates with an issuer and/or transaction processing system (not shown) to generate and/or provision a $D_{Token}$ (as described previously). In some non-limiting embodiments or aspects, $D_{Token}$ is mapped with an $M_{Token}$ from user device, and in some non-limiting embodiments, such mapping is stored in a token vault. In step (s5), the $D_{Token}$ is transmitted to user device, to allow user device to conduct transactions therewith.

With continuing reference to FIG. 11, in step (s6), renter or lessee can, in non-limiting embodiments or aspects, pair user device with the communication device, requesting the device identifier. In step (s7), communication device transmits the device identifier to user device. In step (s8), the renter or lessee conducts a transaction by transmitting $D_{Token}$ and, in some non-limiting embodiment or aspects, device identifier, to a merchant system. As described previously, merchant system may engage in any number of authorization steps, assuring that $D_{Token}$ is eligible to be used for the transaction. In step (s9), the merchant system processes the transaction (as described previously, such processing can include, in some non-limiting embodiments or aspects, an acquirer system, and issuer system associated with appliance owner, an issuer system associated with renter or lessee, and/or a transaction processing system). In some non-limiting embodiments or aspects, in step (s10) the merchant system communicates an acknowledgement of the transaction to user device.

Upon the conclusion of the rental or lease period (step s11), which can in some non-limiting embodiments or aspects be carried out using a mobile application associated with the appliance owner, the appliance owner deletes $D_{Token}$ from the user device (step s12).

Figure 12:
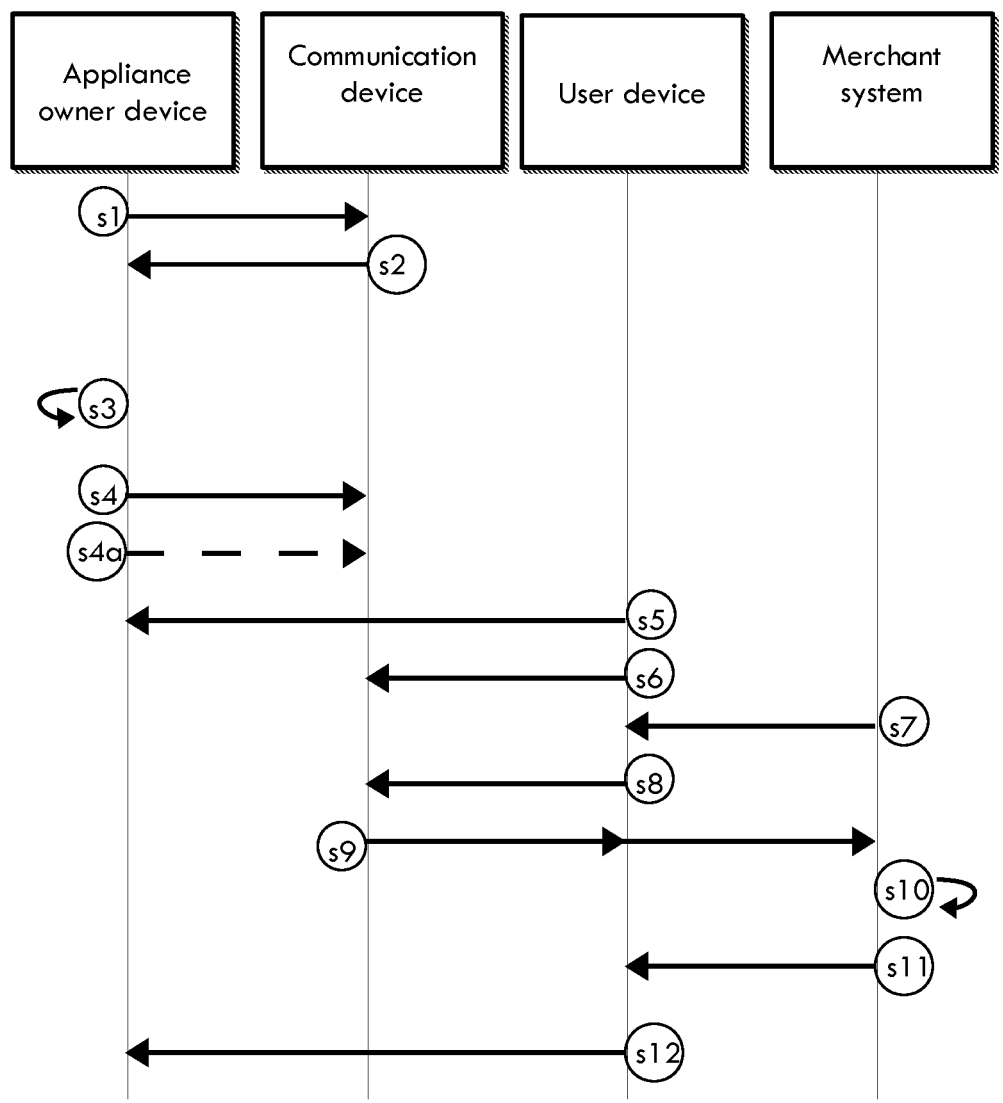
FIG. 12 is a process diagram of one embodiment or aspect of a method for authorizing and provisioning a token to an appliance to process a transaction.

With reference to FIG. 12, illustrated is a method of setting up a virtual account for an appliance and conducting a transaction according to a non-limiting embodiment or aspect in which $D_{Token}$ is not transmitted to a user device. In step (s1), the appliance owner, as described previously, provides a retrofitted communication device to the appliance, and, with a suitable device activates and configures the communication device for use by, for example and without limitation, renters, lessees, or the like. In some non-limiting embodiments or aspects, appliance owner scans a machine-readable indicia or otherwise obtains a code to allow appliance owner to set up/register communication device. In non-limiting embodiments or aspects, in step (s2), the communication device acknowledges activation by the appliance owner. In step (s3) the appliance owner system, based on the information received from the communication device, communicates with an issuer and/or transaction processing system (not shown) to generate and/or provision a $D_{Token}$ (as described previously). In step (s4), $D_{Token}$ is transmitted to the communication device for storage thereon. In step (s4a) (which may or may not be performed) the owner of appliance provides a device identifier associated with the appliance to the communication device. As described previously, in non-limiting embodiments or aspects, the communication device includes a device identifier, and the appliance owner need not provide the same.

In non-limiting embodiments or aspects, in step (s5) a renter or lessee initiates, with a user device, a rental or lease period, and in some non-limiting embodiments through a mobile application associated with the appliance owner. In some non-limiting embodiments or aspects (not shown), $D_{Token}$ is mapped with an $M_{Token}$ from user device, and in some non-limiting embodiments, such mapping is stored in a token vault. In non-limiting embodiments or aspects, in step (s6), the renter or lessee can pair user device with the communication device.

With continuing reference to FIG. 12, in non-limiting embodiments or aspects, conducting a transaction with $D_{Token}$ involves a merchant system, for example a payment station, communicating with user device. In non-limiting embodiments or aspects, in step (s7), merchant system transmits a purchase amount for a given transaction and an identifier associated with the merchant or particular payment station. In step (s8), user device, paired with communication device, transmits the purchase amount and identifier to the communication device. In non-limiting embodiments or aspects, user device is not already paired to communication device, and the user device must be paired to communication device to transmit the purchase amount and identifier. In step (s9), the communication device unpairs from the user device and pairs with the merchant system, allowing transmission of the $D_{Token}$ and, in non-limiting embodiments or aspects, device identifier, to the merchant system.

As described previously, merchant system may engage in any number of authorization steps, assuring that $D_{Token}$ is eligible to be used for the transaction. In step (s10), the merchant system processes the transaction (as described previously, such processing can include, in some non-limiting embodiments or aspects, an acquirer system, and issuer system associated with appliance owner, an issuer system associated with renter or lessee, and/or a transaction processing system). In some non-limiting embodiments or aspects, in step (s11) the merchant system communicates an acknowledgement of the transaction to user device.

In step (s12), the renter or lessee, in some non-limiting embodiments or aspects using a mobile application associated with the appliance owner, ends the rental or lease period. In the embodiment or aspect illustrated in FIG. 12, because $D_{Token}$ was never transmitted to the user device, it need not be deleted therefrom by the appliance owner.

Cloud-Based Indexing of $D_{PAN}$ to $M_{PAN}$

Various embodiments and aspects discussed above and below involve use of a token vault to map and/or store a mapping of a $D_{Token}$, $D_{PAN}$, $M_{Token}$, and/or $M_{PAN}$. Existing token vaults, with existing architecture, may not be suitable for the methods described herein. Use of a cloud-based data structure as shown below can reduce or eliminate the need for a transaction processing system or issuer system token vault to be updated to implement the methods described herein. Accordingly, also provided herein are systems and methods for mapping a PAN and/or token issued to an appliance ($D_{PAN}$/$D_{Token}$) to a PAN and/or token associated with an owner or user of the appliance ($M_{PAN}$/$D_{Token}$). Various systems and methods for generating $D_{PANs}$ (and $D_{Tokens}$ therefrom), associating or mapping a $D_{PAN}$ (and/or $D_{Token}$) with an $M_{PAN}$, and storing the same in a token vault have been described above. As described above, the "cloud-based token vault" refers to a system in which at least one portion of the tokenization process is hosted by a system separate from a transaction processing system and/or issuer system that typically houses a token vault. In non-limiting embodiments or aspects, existing token vaults, with existing architecture, can be used, and the process of checking token activation is carried out by querying the cloud-based token vault, which is separate from the token vault stored by the transaction processing system and/or issuer system. In non-limiting embodiments or aspects, mapping of a $D_{PAN}$ to an $M_{PAN}$ and storage of that mapping can occur in a cloud-based manner, separate from a transaction processing system or issuer system token vault, based on the following data structure.

In a first step of a non-limiting embodiment or aspect of the method, cloud-based token vault is arranged as shown below:

| Token | PAN |
| --- | --- |
| $D_{Token1}$ $M_{Token1}$ | $D_{PAN1}$ $M_{PAN1}$ |
| Device Token ($D_{Token}$) | Master Token ($M_{Token}$) |
| $D_{Token1}$ | Null |

That is, cloud-based token vault stores a $D_{PAN}$ and a $D_{Token}$ associated with an appliance and a $M_{PAN}$ and $M_{Token}$ associated with a prospective user, renter, or lessee of an appliance. Cloud-based token vault maps the respective PANs to the respective tokens. In non-limiting embodiments or aspects, the first table above, mapping tokens to PANs, is contained in an existing token vault, with existing architecture. In non-limiting embodiments or aspects, the second table above, mapping $D_{Tokens}$ to $M_{Tokens}$, is stored on a separate system, for example a cloud-based system, and the activation status of the $D_{Token}$ can be checked without the need to query the transaction processing system or any other system that retains the token vault.

In non-limiting embodiments or aspects, prospective user, renter, or lessee reserves, books, or otherwise takes possession of the appliance, for example and without limitation through a mobile application associated with the appliance owner. Data concerning this action can be transmitted to the entity hosting the cloud-based token vault (transaction processing system, issuer system, and/or both). In non-limiting embodiments or aspects, mapping in the cloud-based token vault is then updated, to reflect the association of the $D_{Token}$ and the $M_{Token}$, as shown below.

| Token | PAN |
|---|---|
| $D_{Token1}$ | $D_{PAN1}$ |
| $M_{Token1}$ | $M_{PAN1}$ |
| Device Token ($D_{Token}$) | Master Token ($M_{Token}$) |
| $D_{Token1}$ | $M_{Token1}$ |

As described above, the first table (mapping of Tokens to PANS) can reside in existing token vaults with existing architecture, while the second table (mapping $D_{Tokens}$ to $M_{Tokens}$) can reside in a cloud-based system. When the $D_{Token}$ is utilized for conducting a transaction, in non-limiting embodiments or aspects, the validity or activation status of the $D_{Token}$ is checked (by its association with an Woken), and, if valid, the $D_{Token}$ is utilized to conduct the requested transaction. By virtue of the mapping of $D_{Token}$ (e.g., $D_{Token1}$) to a $D_{PAN}$ (e.g., $D_{PAN1}$), the $D_{PAN}$ is utilized to settle the transaction. In non-limiting embodiments or aspects, $M_{PAN}$ is not used in any step of the transaction. In non-limiting embodiments or aspects, $M_{PAN}$ is only utilized in terms of an authorization check (e.g., $D_{PAN}$ can only be used to settle a transaction if it is active, for example by virtue of being mapped to an $M_{PAN}$).

In non-limiting embodiments or aspects, transaction processing system and/or issuer system (for example, through mobile application, as described above) can request access to the $M_{Token}$ present on user device used to secure the reservation or booking of the appliance, and cloud-based token vault can then be updated.

With $D_{Token}$ mapped to $M_{Token}$, transactions can quickly be authorized. In non-limiting embodiments or aspects, a transaction is authorized only if $D_{Token}$ is mapped to an $M_{Token}$ in the cloud-based token vault. In non-limiting embodiments or aspects, merchant system and/or acquirer system communicates an authorization request to the transaction processing system or issuer system, which queries the cloud-based token vault to determine whether $D_{Token}$ is mapped to an Woken, and communicates an authorization to the acquirer system or merchant system if such a mapping is present.

In non-limiting embodiments or aspects, at the conclusion of a rental or lease period, any balance accumulated by $D_{Token}$ is satisfied from $M_{PAN}$, based on the mapping of $D_{Token}$ to $M_{Token}$ in the cloud-based token vault. In other non-limiting embodiments or aspects, balance accumulated by $D_{Token}$ during one or more rental or lease periods is satisfied at the conclusion of a billing cycle. Because the end of a billing cycle may not correspond to the end of a rental or lease period, cloud-based token vault can store historical mappings of $D_{Token}$ to various $M_{Tokens}$, and total outstanding balance and/or a portion thereof attributable to specific transactions and/or specific $M_{Tokens}$ entered into during an associated rental or lease period (or portion thereof) are satisfied from the appropriate $M_{PAN}$, based on the historical mapping of $D_{Token}$ to appropriate $M_{Token}$.

With regard to settlement and satisfaction of a balance accumulated by a $D_{PAN}$ during a rental or lease period, in non-limiting embodiments or aspects, a transaction processing system and/or issuer system has a token vault or cloud-based token vault as described above, storing a mapping of $D_{Token}$ and/or $D_{PAN}$ to $M_{PAN}$ and/or $M_{Token}$. At the conclusion of a rental or lease period (e.g., at the end of a business day), all charges to $D_{PAN}$ are settled through $M_{PAN}$ by sending a settlement request to issuer system of $M_{PAN}$. In non-limiting embodiments or aspects, settlement occurs at the end of a billing cycle for $D_{PAN}$, as described above. In non-limiting embodiments or aspects, $D_{PAN}$ balance is satisfied by $M_{PAN(S)}$, and a statement is generated and transmitted to the $M_{PAN}$ owner(s). Thus, in non-limiting embodiments or aspects, the renters or lessees directly settle the bill (or relevant portion thereof) with the $D_{PAN}$ issuer (e.g., no payment is made to the appliance owner). In non-limiting embodiments or aspects, a statement is generated and transmitted by $M_{PAN}$ issuer or $D_{PAN}$ issuer. In non-limiting embodiments or aspects, the appliance owner settles the bill for the appliance, and generates and transmits a statement to $M_{PAN}$ owner, thus billing the renter or lessee for use of the appliance. In non-limiting embodiments or aspects, the appliance owner generates multiple bills or invoices corresponding to the number of lessees or renters of the appliance during a given period (e.g., rental period, billing cycle, etc.). In non-limiting embodiments or aspects, renter(s) or lessee(s) can submit payment to the appliance owner, who settles the bill for the $D_{PAN}$. In non-limiting embodiments or aspects, the statement is generated and transmitted upon the close of the rental or lease period. In non-limiting embodiments or aspects, the statement is generated and transmitted at the close of a billing cycle for $D_{PAN}$.

In non-limiting embodiments or aspects, token vault or cloud-based token vault is separate from transaction processing system and/or issuer system, and is maintained by a third party to the merchant, transaction processing system, and issuer system. In such a situation, there is no change to the settlement that occurs at the conclusion of a rental or lease period (e.g., at the end of a business day). All charges to $D_{PAN}$ are settled through $M_{PAN}$ by sending a settlement request to issuer system of $M_{PAN}$. However, in embodiments or aspects in which settlement occurs at the close of a billing cycle, transaction processing system receives mapping history from the token vault or cloud-based token vault, and statements are generated based thereon by issuer system for $M_{PAN}$, issuer system for $D_{PAN}$, or appliance owner.

Appliances Having Multiple $D_{PANs}$

Also provided herein are systems and methods for issuing multiple $D_{PANs}$ to an appliance. Issuance of a PAN to an appliance is described previously, as is assignment of a credit score to an appliance. As described previously, an appliance may have a device profile, and the device profile may be used to implement targeted promotional recommendations, offers, and/or merchant loyalty or reward point program restrictions. Because an appliance's $D_{PAN}$ may be restricted for use with certain merchants and/or for the purchase of certain products/services or classes of products/services, a merchant may provide targeted promotions and offers to the appliance. As a result, loyalty rewards or points may accumulate more quickly given the specific field of use of the $D_{PAN}$. In non-limiting embodiments or aspects, an appliance can be assigned multiple $D_{PANs}$. As described above, an appliance can have a credit score assigned thereto, and multiple issuers may be interested in issuing $D_{PANs}$ to an appliance having a high credit score. Accordingly, in some non-limiting embodiments or aspects, an appliance can have multiple $D_{PANs}$ issued thereto, the $D_{PANs}$ issued by one or more issuers. In non-limiting embodiments or aspects, each $D_{PAN}$ may be issuer specific, merchant specific, and/or domain specific, thus allowing for even more rapid accumulation of loyalty or other reward points, and, as described previously, an appliance with a high balance of loyalty rewards or points may maintain a higher resale or residual value for a user/owner.

In non-limiting embodiments or aspects, a device ($D_1$) has a number of PANS issued thereto, $D_{1PAN1}$, $D_{1PAN2}$, $D_{1PAN3}$, $D_{1PANn}$. In non-limiting embodiments or aspects, each $D_{PAN}$ (and/or $D_{Token}$) is mapped in a token vault or cloud-based token vault as described above to a distinct appliance owner $M_{PAN}$ (and/or Woken). In non-limiting embodiments or aspects, each $D_{PAN}$ is mapped to a single appliance owner $M_{PAN}$. An exemplary mapping is illustrated below.

| Device PAN ($D_{PAN}$) | Master PAN ($M_{PAN}$) |
|---|---|
| $D_{1PAN1}$ | $M_{PAN1}$ |
| $D_{1PAN1}$ | |
| $D_{1PAN3}$ | |
| $D_{1PANn}$ | |

In non-limiting embodiments or aspects, each $D_{PAN}$ is issued by a distinct issuer, or by the same issuer. In non-limiting embodiments or aspects, each $D_{PAN}$ has a distinct credit limit, for example based on an appliance credit score as described previously. In non-limiting embodiments or aspects, each $D_{PAN}$ is issued by an issuer for a specific merchant or issuer type (e.g., a gas card, an automotive parts/repair service provider, a home improvement retailer). In non-limiting embodiments or aspects, when merchant or acquirer system transmits a transaction authorization request to transaction processing system and/or issuer system (as described previously), the transaction authorization request includes a unique identifier, for example, and without limitation, a unique identifier that identifies the merchant that identifies a domain associated with the merchant (e.g., merchant, goods or services domain, or the like). In non-limiting embodiments or aspects, the transaction authorization request includes such information (merchant identifier, domain identifier, or the like) to allow for the selection of a PAN that can provide the greatest benefit in terms of rewards or the like. For example and without limitation, if the merchant identifier indicates that the transaction is taking place or took place at a HOME DEPOT store, a PAN associated with a HOME DEPOT-branded electronic payment device can be selected. When transaction processing system and/or issuer system queries the token vault or cloud-based token vault, the unique identifier can be included such that an appropriate $D_{Token}$ and/or $D_{PAN}$ can be selected to maximize loyalty rewards or other benefits.

In non-limiting embodiments or aspects, an appliance may have multiple $D_{PANs}$ associated therewith, one for personal use of the appliance by the appliance owner and another for commercial use of the appliance, e.g., by a renter or lessee. In non-limiting embodiments or aspects, appliance may have $D_{PAN1}$ issued for personal use by the owner and $D_{PAN2}$ issued for commercial use by renters or lessees. $D_{PAN1}$ (or $M_{Token1}$) is mapped to $M_{PAN}$ (or $M_{Token}$) associated with the owner, while $D_{PAN2}$ can be dynamically mapped to $M_{PANs}$ (or $M_{Tokens}$) for renters or lessees, as described previously.

In non-limiting embodiments or aspects, an appliance is owned by multiple individuals or businesses. In non-limiting embodiments, an appliance may have multiple $D_{PANs}$ issued thereto, one specific to each owner. In non-limiting embodiments or aspects, an appliance may have one or more $D_{PANs}$; e.g., one or more owner $D_{PANs}$ and/or one or more commercial $D_{PANs}$, which are apportioned across a number of $M_{PANs}$ (or $M_{Tokens}$). An exemplary mapping is illustrated below.

| Device PAN ($D_{PAN}$) | Master PAN ($M_{PAN}$) |
|---|---|
| $D_{PAN1}$ | $M_{PAN1}$ |
| | $M_{PAN2}$ |
| $D_{PAN2}$ | $M_{PAN2}$ |
| | $M_{PAN3}$ |

Mapping of $D_{PAN1}$ to owner $M_{PANs}$ ($M_{PAN1}$ and $M_{PAN2}$) can be made at the time of purchase or any other transfer of ownership, as described previously. Mapping of $D_{PAN2}$ to $M_{PAN2}$, $M_{PAN3}$, $M_{PANn}$, can occur based on rental or leasing of the appliance, as also described previously.

In non-limiting embodiments, transactions entered into with $D_{PAN1}$ can be satisfied by an equal apportionment between $M_{PAN1}$ and $M_{PAN2}$, or by any other predefined rule. Rules, predefined or otherwise, can be stored in the token vault or cloud-based token vault, or by a transaction processing system or issuer system, and can be updated throughout ownership of the appliance.

With further reference to the above embodiment or aspect in which a single $D_{PAN}$ is mapped to multiple $M_{PANs}$, in some non-limiting embodiments or aspects, an appliance has a single $D_{PAN}$ (or a $D_{PAN}$ for commercial use), and multiple $M_{PANs}$ can be mapped thereto, in a token vault or cloud-based token vault as described previously, to facilitate splitting of a transaction among multiple users. An exemplary mapping is illustrated below.

| Device PAN ($D_{PAN}$) | Master PAN ($M_{PAN}$) |
|---|---|
| $D_{PAN1}$ | $M_{PAN1}$ |
| | $M_{PAN2}$ |
| | $M_{PAN3}$ |
| | $M_{PAN4}$ |

In non-limiting embodiments or aspects, an appliance is a smart home appliance, e.g., a refrigerator in a shared rented accommodation (e.g. AirBnB, VRBO, or the like). Multiple renters may simultaneously be present in the unit, and all may have access to a single common refrigerator. In non-limiting embodiments or aspects, the refrigerator can have its own $D_{PAN}$ and credit limit. The multiple renters, each with their own $M_{PAN}$, can temporarily link their individual $M_{PANs}$ (and/or $M_{Tokens}$) to the device PAN, as described previously, to allow the refrigerator to make transactions, as described previously.

In non-limiting embodiments or aspects, multiple users of a rented or leased device may find it desirable to split a payment made by the rented device across their PANs. In non-limiting embodiments or aspects, the appliance is a rental car, cab, or shared-ride vehicle. The vehicle has its own $D_{PAN}$ and the users can link their $M_{PANs}$ (and/or $M_{Tokens}$) to the $D_{PAN}$, as described previously, and each transaction made by the vehicle using the $D_{PAN}$ can be satisfied by being equally distributed amongst the three $M_{PANs}$ (and/or $M_{Tokens}$).

In non-limiting embodiments or aspects, a single owner of a home appliance having a $D_{PAN}$ can link multiple $M_{PANs}$ (and/or $M_{Tokens}$) to the $D_{PAN}$ and configure settings, such as, for example and without limitation, domain restrictions as described previously, for the usage of one of the $M_{PANs}$ (and/or $M_{Tokens}$) in specific circumstances. In non-limiting embodiments or aspects, the settings concern offers (e.g., loyalty or other rewards) linked to a specific PAN. In other non-limiting embodiments or aspects, the settings concern credit limits for the various $M_{PANs}$. In non-limiting embodiments or aspects, the home appliance can enter into transactions on its own (as described previously), and predetermined rules can be utilized to apportion the balance of the transaction to one or more $M_{PANs}$ (and/or $M_{Tokens}$) mapped to the $D_{PAN}$. In some non-limiting embodiments or aspects, for transactions conducted through the appliance, the appliance includes a display, for example and without limitation a touchscreen, from which a user can select the appropriate $M_{PAN}$ (and/or $M_{Token}$) to be used for the transaction. In non-limiting embodiments or aspects, authorizing a transaction in this manner can require two-factor authentication to prevent fraudulent activity. In non-limiting embodiments or aspects, the appliance, transaction processing system, and/or issuer system stores data relating to the identity of the $M_{PAN}$ or $M_{Token}$ selected so that proper settlement of any outstanding $D_{PAN}$ balance is assured.

Transaction flows for transactions in which a $D_{PAN}$ is involved have been described previously. In some non-limiting embodiments or aspects, the appliance enters into the transaction through use of $D_{PAN}$ (or a $D_{Token}$ associated with $D_{PAN}$). In non-limiting embodiments or aspects, a transaction is initiated through a mobile application associated with the appliance owner or lessor, a specific merchant, and/or a specific issuer. For example, in non-limiting embodiments or aspects, renters of an apartment or home can utilize a mobile application to order groceries. As previously described, during the reserving or booking process, transaction processing system or issuer system may request access to an $M_{Token}$ stored on a user's mobile device, and, in non-limiting embodiments or aspects, a $D_{Token}$ can be transferred to a user's mobile device. Accordingly, when a user enters into a transaction for which $D_{PAN}$ (or $D_{Token}$) is utilized, the mobile application can request access to the $D_{Token}$, $D_{Token}$ can be communicated to transaction processing system or issuer system, and, by virtue of the mapping in token vault or cloud-based token vault, the transaction can be authorized. As also described previously, in some non-limiting embodiments or aspects, two-factor authentication, or other input from a user, can be required to complete a transaction. In non-limiting embodiments, a renter can utilize an appliance to enter into a transaction (e.g., a renter utilizes a refrigerator having a $D_{PAN}$ to purchase groceries), and the mobile application through which the transaction is initiated can provide an authorization code that must be entered, for example and without limitation into the appliance via a touchscreen or other input device, in order to complete the transaction. As also described previously, balances accumulated by the $D_{PAN}$ can be satisfied by the mapped $M_{PANs}$ on a transaction-by-transaction basis, or can be satisfied upon close of a rental or lease period or the end of a billing cycle for the $D_{PAN}$. For example, and without limitation, token vault or cloud-based token vault can store an historical mapping of $M_{PANs}$ to the $D_{PAN}$, and can satisfy balances accumulated by the $D_{PAN}$ based on transactions entered into by prior users during a given billing cycle.

EXAMPLES

Example 1—Smart Home

In a smart home implementation incorporating a non-limiting embodiment described herein, one or more appliances, such as a washing machine, refrigerator, television, and/or the like, conduct transactions with providers of goods and/or services, utility companies, and/or device manufacturers, for example, and without limitation, to order supplies that are or are believed to be depleted, to schedule maintenance or repairs, to purchase media content or software, to purchase access to a service, and/or the like. The transaction is requested using one or more $D_{Tokens}$ and/or $D_{PANs}$ associated with the respective appliances. As described above, the $D_{PAN}$ provisioned on each device may have associated domain restrictions, such as, for example and without limitation, a permitted list of products, brands, and merchants along with credit/debit limit values and/or transaction limit values. The appliances may also be preconfigured with an initial credit limit/debit fund value (e.g., $20, $50, etc. depending on device model and/or manufacturer), which may be incorporated into the sales/rental/lease price of the appliance with or without a discount.

In addition to driving promotional recommendations and offers as described above, device profiles can also be used for relative profile ranking. Relative ranking of device profiles can be developed in a manner analogous to that for customer profiles with credit card issuers. The higher a device profile is ranked, the better the offers that can be availed using the $D_{PAN}$ issued to the device. Consequently, a better profile adds value to a device, which adds a premium to the resale value of the device. For example, and without limitation, a washing machine, which purchases primarily detergent and detergent-like products, can be limited to a specific merchant domain, may receive targeted promotions or offers, and may rapidly accumulate loyalty or reward points associated with the merchant. This accumulated value adds to resale value, as the accumulated loyalty or reward points can contribute to lower cost of operation in the future, which can be advertised by the appliance owner when attempting to sell the appliance. Identical appliances (in terms of manufacturer/model), but with different device profiles, could have different resale values owing to the difference in goods/services offer benefits available to the new owners.

An additional feature of a smart home solution includes splitting payments across a plurality of appliances with overlapping domain restrictions. For example, and without limitation, a refrigerator in which the $D_{PAN}$ is limited to a specific monthly, quarterly, or yearly credit/debit limit value may, when submitting a transaction request, combine its remaining credit/debit limit value with that of a microwave provisioned with a $D_{PAN}$ that maintains a sufficient amount of credit/debit limit value based on the microwave's device profile. Moreover, appliances in a common household may seek permission to use offers (e.g., discounts) available on other devices with overlapping domain restrictions.

Example 2—Smart Cars

In a rental car implementation incorporating a non-limiting embodiment described herein, one or more vehicles may conduct transactions with other appliances (e.g., toll booths, gas stations, other automobiles, or other like systems or service providers) and/or conduct transactions with individuals who rent/lease the vehicles.

In such an example, each car in a fleet of rental vehicles may have a financial account issued to it ($D_{PAN}$), with a corresponding token ($D_{Token}$), with a mapping to the fleet owner PAN ($M_{PAN}$) in a token vault. Each vehicle could accept direct payments from renters, and based on the mapping in the token vault, rather than authorization to deduct funds from the $M_{PAN}$ as described above, funds would be received by the appliance, through $D_{PAN}$, from a user/renter account (based on a $U_{PAN}$ or broken), and would be deposited to an account associated with the $M_{PAN}$. In addition, similar to the process described above, a vehicle provisioned with a $D_{Token}$ could make payments for its requirements such as fuel, tolls, maintenance, insurance, and the like. Domain restrictions could be applied at a car payment module to make purchases at specific merchants and/or for specific merchant categories. The vehicles in the rental car fleet may be further connected to each other to allow borrowing/aggregating credit/debit limit values, as described above, if required.

Such a system could also benefit a renter as certain loyalty or reward points, such as fuel reward points, associated with the $D_{PAN}$, as described above, could result in better offers for fuel. Further, in an international location for a renter, the vehicle may pay in local currency, and the renter may therefore avoid multiple foreign currency transactions (including possible currency conversion surcharges) on a single user account identifier.

As explained above, as with all appliances, a vehicle may have a credit/debit limit value assigned based on the vehicle type, manufacturer, transaction history, rental location, and/or the associated credit score of the entity/institution that owns/operates the fleet. The initial credit/debit limit may be defined by the relationship between the automobile manufacturer and a bank/payment network. For example, and without limitation, Car Company A may link with Bank A and Transaction Service Provider A to provision credit/debit cards having $D_{PANs}$ with a limit of $1000 USD for all SUVs manufactured by Car Company A.

Although the systems and methods have been described in detail for the purpose of illustration based on what is currently considered to be the most practical and preferred embodiments, it is to be understood that such detail is solely for that purpose and that the systems and methods are not limited to the disclosed embodiments, but on the contrary, is intended to cover modifications and equivalent arrangements that are within the spirit and scope of the appended claims. For example, it is to be understood that the present systems and methods contemplate that, to the extent possible, one or more features of any embodiment can be combined with one or more features of any other embodiment.

What is claimed is:

1. A computer-implemented method for authorizing and provisioning a token to an appliance, comprising:
   registering, with at least one processor, an original account identifier to at least one appliance, wherein the original account identifier comprises a device account number (DPAN) and is not associated with any user account identifier when registered;
   associating, with at least one processor, a device token to the DPAN, wherein the device token is in an inactive state and is stored by the at least one appliance, and wherein the at least one processor does not store the DPAN on the at least one appliance;
   associating, with at least one processor, a user account identifier to at least one of the device token and the DPAN registered to the at least one appliance;
   activating the device token with at least one processor and based at least in part on the association of the user account identifier with at least one of the device token and the DPAN;
   storing, with at least one processor, the association of the DPAN and the device token in a token vault;
   storing, with at least one processor, an association of a user account token associated with the user account identifier and the device token in a cloud-based token vault that is separate from the token vault;
   receiving, from the at least one appliance, a transaction request for a transaction, the transaction request comprising the device token;
   identifying, with at least one processor, the user account identifier based on the device token received in the transaction request;
   determining, with at least one processor, that the transaction is authorized based at least partially on the association of the user account token and the device token stored in the cloud-based token vault; and
   in response to determining that the transaction is authorized, processing the transaction.

2. The computer-implemented method of claim 1, wherein determining that the transaction is authorized comprises:
   communicating an authorization request to an issuer system associated with the DPAN registered to the at least one appliance;
   communicating an authorization request to an issuer system associated communicating an authorization request to an issuer system associated with the user account identifier; and
   receiving at least one authorization response message from at least one of the issuer system associated with the user account identifier and the issuer system associated with the DPAN registered to the at least one appliance.

3. The computer-implemented method of claim 1, wherein registering the DPAN to the at least one appliance comprises associating at least one device identifier unique to the at least one appliance with the DPAN.

4. The computer-implemented method of claim 1, further comprising:
   aggregating transaction values from the transaction and at least one other transaction initiated by the at least one appliance within a time period to calculate an aggregated transaction value; and
   generating an authorization request to deduct the aggregated transaction value from a user account corresponding to the user account identifier.

5. The computer-implemented method of claim 1, further comprising generating at least one device profile for the at least one appliance based at least partially on at least one of the following device parameters: model, manufacturer, transaction history, age, service history, or any combination thereof.

6. The computer-implemented method of claim 5, further comprising generating a credit limit value for the at least one appliance based at least partially on the device profile.

7. The computer-implemented method of claim 6, wherein processing the transaction comprises:
   determining that a transaction value associated with the transaction satisfies the credit limit value;
   in response to determining that the transaction value does not satisfy the credit limit value, communicating a rejection of the transaction to the at least one appliance or to an acquirer system;
   receiving, from the at least one appliance and/or at least one other appliance, a new transaction request for the transaction, the new transaction request comprising the device token and at least one other device token associated with the at least one other appliance; and in response to determining that the new transaction request is authorized, processing the new transaction by charging a first portion of the transaction value to an account corresponding to the device token and a second portion of the transaction value to an account corresponding to the at least one other device token.

8. The computer-implemented method of claim 6, wherein registering the DPAN to the at least one appliance comprises generating the credit limit value.

9. The computer-implemented method of claim 1, further comprising:
generating, with at least one processor, an appliance credit score for the at least one appliance based at least partially on at least one of the following device parameters: model, manufacturer, transaction history, age, service history, appliance serial number, time used, energy used, energy efficiency, appliance location, whether use of the appliance is commercial use or personal use, or any combination thereof.

10. The computer-implemented method of claim 9, wherein the step of the appliance credit score comprises:
generating, with at least one processor and from at least one of the device parameters, at least one weighted value;
comparing, with at least one processor, the at least one weighted value to at least one weighted value obtained from at least one other appliance; and
generating, with at least one processor and based at least partially on the comparison, the appliance credit score.

11. A system for authorizing and provisioning a token to an appliance, comprising at least one processor programmed and/or configured to:
register an original account identifier to at least one appliance, wherein the original account identifier comprises a device account number (DPAN) and is not associated with any user when registered;
associate a device token to the DPAN, wherein the device token is stored in an inactive state by the at least one appliance and wherein the at least one processor is programmed and/or configured to not store the DPAN on the at least one appliance;
associate a user account identifier for a user to at least one of the device token and the DPAN registered to the at least one appliance;
activate the device token based at least in part on the association of the user account identifier to the at least one of the device token and the DPAN;
store the association of the DPAN and the device token in a token vault;
store an association of a user account token associated with the user account identifier and the device token in a cloud-based token vault that is separate from the token vault;
receive, from the at least one appliance, a transaction request for a transaction, the transaction request comprising the device token;
identify the user account identifier based on the device token received in the transaction request;
determine that the transaction is authorized based at least partially on the association of the user account token and the device token stored in the cloud-based token vault; and
in response to determining that the transaction is authorized, process the transaction.

12. The system of claim 11, wherein the at least one processor is programmed and/or configured to determine that the transaction is authorized by:

communicating an authorization request to an issuer system associated with the DPAN registered to the at least one appliance;
communicating an authorization request to an issuer system associated communicating an authorization request to an issuer system associated with the user account identifier; and
receiving at least one authorization response message from at least one of the issuer system associated with the user account identifier and the issuer system associated with the DPAN registered to the at least one appliance.

13. The system of claim 11, wherein the at least one processor is programmed and/or configured to register the DPAN to the at least one appliance by associating at least one device identifier unique to the at least one appliance with the DPAN.

14. The system of claim 13, wherein the at least one processor is further programmed and/or configured to:
aggregate transaction values from the transaction and at least one other transaction initiated by the at least one appliance within a time period to calculate an aggregated transaction value; and
generate an authorization request to deduct the aggregated transaction value from a user account corresponding to the user account identifier.

15. The system of claim 11, wherein the at least one processor is further programmed and/or configured to generate a device profile for the at least one appliance based at least partially on at least one of the following device parameters: model, manufacturer, transaction history, age, service history, or any combination thereof.

16. The system of claim 15, wherein the at least one processor is further programmed and/or configured to generate a credit limit value for the at least one appliance based at least partially on the device profile.

17. The system of claim 16, wherein the at least one processor is programmed and/or configured to process the transaction by:
determining that a transaction value associated with the transaction satisfies the credit limit value;
in response to determining that the transaction value does not satisfy the credit limit value, communicating a rejection of the transaction to the at least one appliance;
receiving, from the at least one appliance and/or at least one other appliance, a new transaction request for the transaction, the new transaction request comprising the device token and at least one other device token associated with the at least one other appliance; and
in response to determining that the new transaction is authorized, processing the new transaction by charging a first portion of the transaction value to an account corresponding to the device token and a second portion of the transaction value to an account corresponding to the at least one other device token.

18. The system of claim 16, wherein registering the DPAN to the at least one appliance comprises generating the credit limit value.

19. The system of claim 11, wherein the at least one processor is further programmed or configured to:
generate, with at least one processor, an appliance credit score for the at least one appliance based at least partially on at least one of the following device parameters: model, manufacturer, transaction history, age, service history, appliance serial number, time used, energy used, energy efficiency, appliance location, whether use of the appliance is commercial use or personal use, or any combination thereof.

20. The system of claim 19, wherein the at least one processor is programmed or configured to generate the appliance credit score by:

generating, from at least one of the device parameters, at least one weighted value;

comparing the at least one weighted value to at least one weighted value obtained from at least one other appliance; and generating, based at least partially on the comparison, the appliance credit score.

* * * * *

UNITED STATES PATENT AND TRADEMARK OFFICE
CERTIFICATE OF CORRECTION

| | |
|---|---|
| PATENT NO. | : 11,810,105 B2 |
| APPLICATION NO. | : 16/907827 |
| DATED | : November 7, 2023 |
| INVENTOR(S) | : Surendra Vyas et al. |

It is certified that error appears in the above-identified patent and that said Letters Patent is hereby corrected as shown below:

In the Claims

Column 44, Lines 24-25, Claim 2, below "appliance;" delete "communicating an authorization request to an issuer system associated"

Column 46, Lines 4-5, Claim 12, below "appliance;" delete "communicating an authorization request to an issuer system associated"

Signed and Sealed this
Second Day of January, 2024

Katherine Kelly Vidal
*Director of the United States Patent and Trademark Office*